（12）United States Patent
Olsson

(10) Patent No.: US 10,203,717 B2
(45) Date of Patent: Feb. 12, 2019

(54) MAGNETIC THUMBSTICK USER INTERFACE DEVICES

(75) Inventor: Mark S. Olsson, La Jolla, CA (US)

(73) Assignee: SEESCAN, INC., San Diego, CA (US)

( * ) Notice: Subject to any disclaimer, the term of this patent is extended or adjusted under 35 U.S.C. 154(b) by 1358 days.

(21) Appl. No.: 13/272,172

(22) Filed: Oct. 12, 2011

(65) Prior Publication Data

US 2012/0274563 A1 Nov. 1, 2012

Related U.S. Application Data

(60) Provisional application No. 61/525,755, filed on Aug. 20, 2011, provisional application No. 61/424,496, filed on Dec. 17, 2010, provisional application No. 61/419,150, filed on Dec. 2, 2010, provisional application No. 61/411,406, filed on Nov. 8, 2010, provisional application No. 61/392,302, filed on Oct. 12, 2010.

(51) Int. Cl.
  *G06F 3/047* (2006.01)
  *G05G 9/047* (2006.01)
  *G06F 3/0338* (2013.01)
  *H01H 25/00* (2006.01)

(52) U.S. Cl.
  CPC .......... *G05G 9/047* (2013.01); *G06F 3/0338* (2013.01); *H01H 25/008* (2013.01)

(58) Field of Classification Search
  CPC .................. G06F 3/033; G06F 2203/0333
  USPC .................. 345/161, 156–157, 160
  See application file for complete search history.

(56) References Cited

U.S. PATENT DOCUMENTS 3,112,464 A 11/1963 Ratajaski
3,170,323 A 2/1965 Kurt
(Continued)

FOREIGN PATENT DOCUMENTS

DE 19501439 9/1996
DE 19806611 8/1999
(Continued)

OTHER PUBLICATIONS

International Searching Authority, "Written Opinion of the International Searching Authority" for PCT Patent Application No. PCT/IB10/01039, dated Oct. 15, 2011, European Patent Office, Munich.
(Continued)

*Primary Examiner* — Carolyn R Edwards
(74) *Attorney, Agent, or Firm* — Steven C. Tietsworth, Esq.; Heena Sharma

(57) ABSTRACT

A magnetic thumbstick device including a manual actuator assembly, a restorative element, a base assembly, one or more magnets, and one or more magnetic sensors is disclosed. The magnetic sensor is positioned to measure magnetic fields generated by movement of the magnet, which may be disposed in the manual actuator assembly, and sensed by the magnetic sensor, which may be disposed in the base assembly. These magnetic field signals may then be provided to a processing element where they may be used to determine position and/or motion of the magnet in relation to the magnetic sensor. The processing element may further generate output signals or commands usable by an electronic computing system such as personal computer, cellular phone, video game console, or other device.

29 Claims, 14 Drawing Sheets

(56) References Cited

U.S. PATENT DOCUMENTS

| | | |
|---|---|---|
| 3,331,971 A | 7/1967 | Moller |
| 3,764,779 A | 10/1973 | Kadoya |
| 3,980,808 A | 9/1976 | Kikuchi |
| 4,107,604 A | 8/1978 | Bernier |
| 4,161,726 A | 7/1979 | Burson |
| 4,216,467 A | 8/1980 | Colston |
| 4,293,837 A | 10/1981 | Jaffe |
| 4,348,142 A | 9/1982 | Figour |
| 4,459,578 A | 7/1984 | Sava |
| 4,489,303 A | 12/1984 | Martin |
| 4,490,710 A | 12/1984 | Kopsho et al. |
| 4,500,867 A | 2/1985 | Ishitobo |
| 4,651,558 A | 3/1987 | Martin |
| 4,733,214 A | 3/1988 | Andresen |
| 4,774,458 A | 9/1988 | Aronoff |
| 4,785,180 A | 11/1988 | Dietrich |
| 4,825,157 A | 4/1989 | Milkan |
| 4,853,630 A | 8/1989 | Houston |
| 4,879,556 A | 11/1989 | Duimel |
| 4,998,182 A | 3/1991 | Krauter |
| 5,045,842 A | 9/1991 | Galvin |
| 5,146,566 A | 9/1992 | Hollis, Jr. |
| 5,160,918 A | 11/1992 | Saposnik |
| 5,168,221 A * | 12/1992 | Houston ............... G01B 7/003 324/207.13 |
| 5,450,054 A | 9/1995 | Schmersal |
| 5,504,502 A * | 4/1996 | Arita et al. ................... 345/160 |
| 5,525,901 A | 6/1996 | Clymer |
| 5,565,891 A | 10/1996 | Armstrong |
| 5,598,090 A | 1/1997 | Baker |
| 5,619,195 A | 4/1997 | Allen |
| 5,670,987 A | 9/1997 | Doi |
| 5,687,080 A | 11/1997 | Hoyt |
| 5,706,027 A | 1/1998 | Hilton |
| 5,749,577 A | 5/1998 | Couch |
| 5,767,840 A | 6/1998 | Selker |
| 5,831,554 A | 11/1998 | Hedayat |
| 5,831,596 A | 11/1998 | Marshall |
| 5,850,142 A | 12/1998 | Rountos |
| 5,939,679 A | 8/1999 | Olsson |
| 5,959,863 A * | 9/1999 | Hoyt ....................... G05G 9/047 361/290 |
| 5,969,520 A | 10/1999 | Schottler |
| 6,002,184 A | 12/1999 | Delson |
| D421,433 S | 3/2000 | Alviar et al. |
| D422,996 S | 4/2000 | Alviar et al. |
| 6,129,527 A | 10/2000 | Donahoe |
| 6,144,125 A | 11/2000 | Birkestrand |
| 6,225,960 B1 | 5/2001 | Weiss |
| 6,329,812 B1 | 12/2001 | Sundin |
| 6,333,734 B1 | 12/2001 | Rein |
| 6,353,430 B2 | 3/2002 | Cheng et al. |
| 6,462,731 B1 | 10/2002 | Stoffers |
| 6,487,396 B1 * | 11/2002 | Sassi ....................... G06F 1/1616 345/167 |
| 6,501,458 B2 | 12/2002 | Baker |
| 6,550,346 B2 | 4/2003 | Gombert |
| 6,573,709 B1 | 6/2003 | Gandel |
| 6,593,729 B2 | 7/2003 | Sundin |
| 6,597,347 B1 | 7/2003 | Yasutake |
| 6,614,420 B1 | 9/2003 | Han et al. |
| 6,664,946 B1 | 12/2003 | Stipes et al. |
| 6,707,446 B2 | 3/2004 | Nakamura |
| 6,727,889 B2 | 4/2004 | Shaw |
| 6,738,043 B2 | 5/2004 | Endo |
| 6,753,519 B2 | 6/2004 | Gombert |
| 6,762,748 B2 * | 7/2004 | Maatta et al. ................... 345/157 |
| 6,804,012 B2 | 10/2004 | Gombert |
| 6,822,635 B2 | 11/2004 | Shahoian |
| 6,831,679 B1 | 12/2004 | Olsson |
| 6,879,316 B2 | 4/2005 | Kehlstadt |
| 6,891,526 B2 | 5/2005 | Gombert |
| 6,925,975 B2 | 8/2005 | Ozawa |
| 6,928,886 B2 | 8/2005 | Meusel |
| 7,084,856 B2 | 8/2006 | Huppi |
| 7,145,551 B1 | 12/2006 | Bathiche et al. |
| 7,148,880 B2 | 12/2006 | Magara |
| 7,151,526 B2 | 12/2006 | Endo |
| 7,164,412 B2 | 1/2007 | Kao |
| 7,233,318 B1 | 6/2007 | Farag |
| 7,474,296 B2 | 1/2009 | Obermeyer |
| 7,552,541 B2 | 6/2009 | Sakuri |
| 7,733,327 B2 | 6/2010 | Harley |
| 7,737,945 B2 | 6/2010 | West |
| 7,753,788 B2 | 7/2010 | Lum et al. |
| 7,800,581 B2 | 9/2010 | Lye |
| 7,825,903 B2 | 11/2010 | Anastas |
| 7,958,782 B2 | 6/2011 | Le |
| 7,978,175 B2 | 7/2011 | Orsley |
| 8,089,039 B2 | 1/2012 | Pascucci |
| 8,100,030 B2 | 1/2012 | Koschke |
| 8,139,033 B2 | 3/2012 | Yamamoto |
| 8,274,358 B2 | 9/2012 | Ando |
| 8,289,385 B2 | 10/2012 | Olsson |
| 8,497,767 B2 | 7/2013 | Hollis, Jr. |
| 9,134,817 B2 | 9/2015 | Olsson |
| 2001/0055002 A1 * | 12/2001 | Endo ............................. 345/156 |
| 2002/0033795 A1 | 3/2002 | Shahoian |
| 2002/0033798 A1 | 3/2002 | Nakamura et al. |
| 2002/0190945 A1 * | 12/2002 | Arita ....................... G05G 9/047 345/156 |
| 2003/0107551 A1 | 6/2003 | Dunker |
| 2003/0126980 A1 | 7/2003 | Barden |
| 2006/0106454 A1 | 5/2006 | Osborne et al. |
| 2006/0256075 A1 | 11/2006 | Anastas |
| 2006/0290670 A1 | 12/2006 | Ishimaru |
| 2007/0182842 A1 | 8/2007 | Sonnenschein |
| 2007/0216650 A1 | 9/2007 | Frohlich |
| 2007/0262959 A1 | 11/2007 | Gu |
| 2008/0001919 A1 | 1/2008 | Pascucci |
| 2008/0174550 A1 | 7/2008 | Laurila |
| 2008/0290821 A1 | 11/2008 | Brandt |
| 2009/0025094 A1 | 1/2009 | York |
| 2009/0058802 A1 | 3/2009 | Orsley |
| 2009/0071808 A1 | 3/2009 | Kang |
| 2009/0115749 A1 | 5/2009 | Kim |
| 2010/0078795 A1 * | 4/2010 | Dekker ............... H03H 9/0547 257/690 |
| 2010/0265176 A1 | 10/2010 | Olsson |
| 2011/0050405 A1 | 3/2011 | Hollis, Jr. |
| 2011/0102382 A1 | 5/2011 | Shimizu |
| 2012/0215475 A1 | 8/2012 | Rutledge |
| 2012/0256821 A1 | 10/2012 | Olsson |
| 2012/0274563 A1 | 11/2012 | Olsson |

FOREIGN PATENT DOCUMENTS

| | | |
|---|---|---|
| DE | 19954497 | 4/2001 |
| DE | 10 2007 001 745 A1 * | 7/2008 |
| EP | 0628976 | 12/1994 |
| EP | 0982646 | 3/2000 |
| EP | 1193643 | 4/2002 |
| EP | 1708074 A2 | 10/2006 |
| EP | 1926016 A1 | 5/2008 |
| EP | 1953621 | 6/2008 |
| JP | 03036946 | 2/1991 |
| JP | WO 2009044670 A1 * | 4/2009 |
| WO | WO 01/69343 | 9/2001 |
| WO | WO 04/049092 A1 | 6/2004 |
| WO | WO 06/106454 A1 | 10/2006 |
| WO | WO 11/146668 A2 | 11/2011 |
| WO | WO 12/075468 A1 | 6/2012 |

OTHER PUBLICATIONS

International Searching Authority, "Written Opinion of the International Searching Authority" for PCT Patent Application No. PCT/US11/37069, dated Nov. 18, 2012, European Patent Office, Munich.

International Searching Authority, "Written Opinion of the International Searching Authority" for PCT Patent Application No. PCT/US11/48535, dated Feb. 20, 2013, European Patent Office, Munich.

(56) References Cited

OTHER PUBLICATIONS

International Searching Authority, "Written Opinion of the International Searching Authority" for PCT Patent Application No. PCT/US11/56039, dated Apr. 12, 2013, European Patent Office, Munich.
International Searching Authority, "Written Opinion of the International Searching Authority" for PCT Patent Application No. PCT/US11/59835, dated May 8, 2013, European Patent Office, Munich.
International Searching Authority, "Written Opinion of the International Searching Authority" for PCT Patent Application No. PCT/US11/63186, dated Jun. 2, 2013, European Patent Office, Munich.
International Searching Authority, "Written Opinion of the International Searching Authority" for PCT Patent Application No. PCT/US14/38656, dated Nov. 17, 2015, European Patent Office, Munich.
Melexis Microelectronic Integrated Systems, Product Information on Absolute Position Sensor IC, MLX90333.
Tietsworth, Steven C., Response to Non-Final Office Action and Amendment (dated Jan. 7, 2012), regarding Magnetic Manual User Interface Devices, U.S. Appl. No. 12/756,068.

* cited by examiner

MAGNETIC THUMBSTICK USER INTERFACE DEVICES

CROSS-REFERENCE TO RELATED APPLICATIONS

This application claims priority under 35 U.S.C. § 119(e) to U.S. Provisional Patent Application Ser. No. 61/392,302, filed Oct. 12, 2010, entitled MAGNETIC THUMBSTICK DEVICES, to U.S. Provisional Patent Application Ser. No. 61/411,406, filed Nov. 8, 2010, entitled SLIM PROFILE MAGNETIC USER INTERFACE DEVICES, to U.S. Provisional Patent Application Ser. No. 61/419,150, filed Dec. 2, 2010, entitled MAGNETICALLY SENSED KNOB-ACTUATOR USER INTERFACE DEVICE, to U.S. Provisional Patent Application Ser. No. 61/424,496, filed Dec. 17, 2010, entitled KNOB-ACTUATOR USER INTERFACE DEVICE WITH MAGNETIC SENSORS, and to U.S. Provisional Patent Application Ser. No. 61/525,755, filed Aug. 20, 2011, entitled USER INTERFACE DEVICE METHODS AND APPARATUS USING PERMANENT MAGNETS OR ELECTROMAGNETS AND CORRESPONDING MAGNETIC SENSORS, The content of each of these applications is hereby incorporated by reference herein in its entirety for all purposes.

FIELD

The present disclosure relates generally to user interface devices using magnetic sensing, and associated methods, apparatus, and systems. More particularly, but not exclusively, the disclosure relates to magnetically sensed thumbstick user interface devices (also denoted herein as "magnetic thumbstick UIDs" or "magnetic thumbsticks" for brevity) that use magnetic sensing elements, such as magnets and magnetic sensors, to sense positions, motions, deformations, and/or other actions generated by user interactions with UIDs, and provide corresponding output signals to an electronic computing system. Methods of manufacturing such magnetic thumbstick devices are also disclosed.

BACKGROUND

There are many electronic computing systems that have interface circuitry and/or interface software designed to function with a variety of different pointing devices that can be readily manipulated by a user to input commands, move a cursor, select an icon, move a player in virtual space, and the like. A thumbstick device (also denoted herein as a "thumbstick") is one such pointing device often associated with controllers for video game systems that can be actuated by a user's fingers and in particular the thumb. Many modern controllers include at least one and often two thumbsticks to provide control to the user. The thumbsticks contained in such devices typically utilize potentiometers or similar components to determine movement of a manual actuator that, due to the architecture of potentiometers and associated restoration components, contains a mechanical dead band area where movement of the actuator generates no electrical sensing effect.

Therefore, there is a need for improved thumbstick devices, and in particular, durable thumbstick devices with high resolution, minimal dead band, fast response times, as well as to address other problems and provide improvements in the art.

SUMMARY

In one aspect, the disclosure relates to an apparatus for use in a magnetic thumbstick interface device. The apparatus may include, for example, a manual actuator and a magnet disposed in or operatively coupled to the manual actuator for movement therewith. The apparatus may further includes a base section and a restorative element, such as a coil spring, coupled between the base section and the manual actuator for restoring the manual actuator to a neutral position absent user actuation. A magnetic sensor may be positioned to generate signals representative of changes in a magnetic field generated by movement of the permanent magnet through movement of the manual actuator, and a processing element may then receive and process magnetic field signals to generate output signals usable by an electronic computing system.

In another aspect, the disclosure relates to a magnetic thumbstick user interface device (UID). The device may include, for example, a manual actuator assembly comprising a magnet, a manual actuator element, and a movement control element. The device may further include a base assembly comprising a base element and a magnetic sensor for generating magnetic field signals corresponding to a position or movement of the manual actuator element, and a restorative element coupled to the base assembly and the manual actuator assembly for restoring the manual actuator element to a released-state position. The device may further include a processing element for receiving the magnetic field signals and generating, based on a position of the manual actuator element, an output signal usable by an electronic computing system.

In another aspect, the disclosure relates to a method of manufacturing a magnetic thumbstick user interface device. The method may include, for example, positioning a restorative element in contact with a manual actuator assembly element and a base assembly element, and heating the restorative element using magnetic induction to bond the restorative element with the manual actuator assembly element and the base assembly element.

Various additional aspects, details, features, and functions are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Overview

Figure 1:
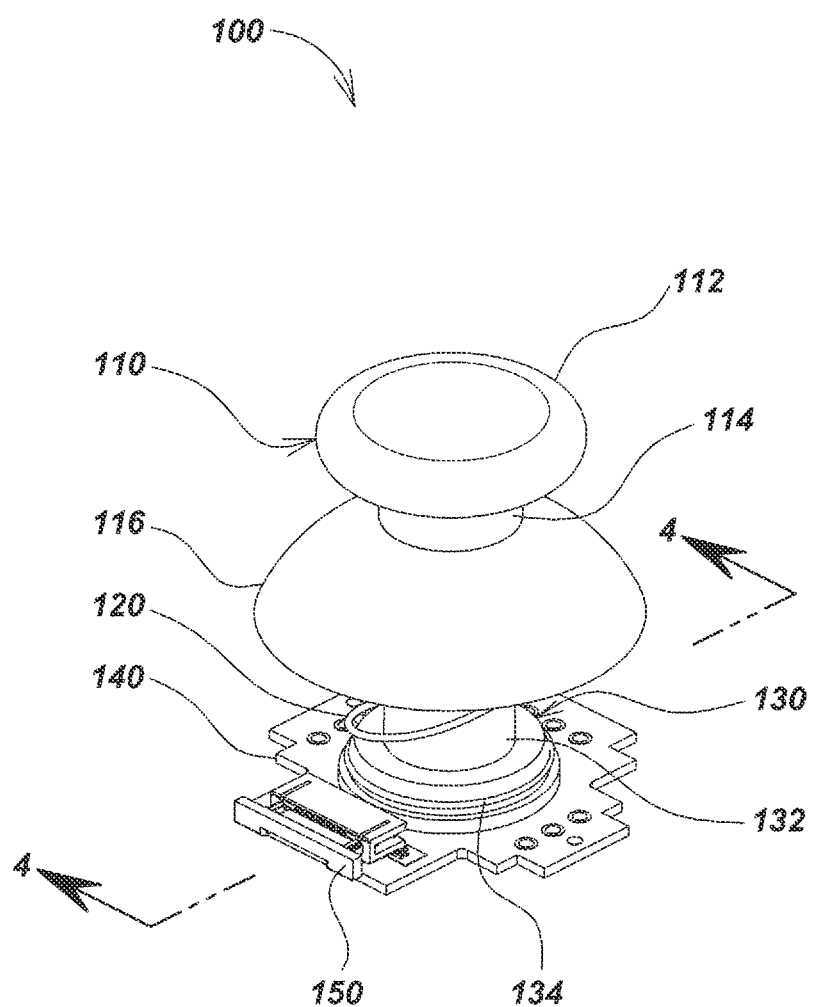
FIG. 1 is an isometric view illustrating one embodiment of a magnetic thumbstick device in accordance with aspects of the present invention.

The present invention relates generally to user interface devices using magnetic sensing, and associated methods, apparatus, and systems. Embodiments of the present invention may be used to provide improved thumbstick devices in which a manual actuator assembly is configured to exhibit resistance to manipulation and return to a neutral position relative to a base element with the use of a restoration element, such as a centering spring. A flexible membrane or other compressed mechanical elements may also be used as restorative elements to generate a restorative force in some embodiments.

For example, in one aspect, the disclosure relates to magnetically sensed thumbstick user interface devices (also denoted herein as "magnetic thumbstick UIDs" or "magnetic thumbsticks" for brevity) that use magnetic sensing elements, such as magnets and magnetic sensors, to sense positions, motions, deformations, and/or other actions generated by user interactions with UIDs, and provide corresponding output signals to an electronic computing system. In another aspect, the disclosure relates to methods of manufacturing such magnetic thumbstick devices are also disclosed.

In another aspect, the disclosure relates to an apparatus for use in a magnetic thumbstick interface device. The apparatus may include, for example, a manual actuator and a magnet disposed in or operatively coupled to the manual actuator for movement therewith. The apparatus may further includes a base section and a restorative element, such as a coil spring, coupled between the base section and the manual actuator for restoring the manual actuator to a neutral position absent user actuation. A magnetic sensor may be positioned to generate signals representative of changes in a magnetic field generated by movement of the permanent magnet through movement of the manual actuator, and a processing element may then receive and process magnetic field signals to generate output signals usable by an electronic computing system.

In another aspect, the disclosure relates to a magnetic thumbstick user interface device (UID). The device may include, for example, a manual actuator assembly comprising a magnet, a manual actuator element, and a movement control element. The device may further include a base assembly comprising a base element and a magnetic sensor for generating magnetic field signals corresponding to a position or movement of the manual actuator element, and a restorative element coupled to the base assembly and the manual actuator assembly for restoring the manual actuator element to a released-state position. The device may further include a processing element for receiving the magnetic field signals and generating, based on a position of the manual actuator element, an output signal usable by an electronic computing system.

The magnet may be, for example, one or more permanent magnets. Alternately, or in addition, the magnet may be one or more electromagnets. The electromagnets may be selectively driven by the processing element.

The movement control element may include, for example, a curved element, and the base assembly may include an element having a contoured surface configured to control movement of the curved element during user actuation of the manual actuator element. The curved element may be a spherical section, and the base assembly includes a pivot pad, wherein the contoured surface is a surface of the pivot pad. The base assembly may further include a retaining sleeve, which may be configured to restrict a motion of the movement control element, such as within an open cylindrical-shaped volume.

The device may further include, for example, a printed circuit board (PCB), which may be coupled to the pivot pad. The magnetic sensor may be disposed on the PCB. Alternately, the magnet may be disposed on the PCB. The processing element, which may include a processor or other programmable device, memory, and/or related electronic components, may also be disposed on the PCB.

The restorative element may be, for example, a spring element or assembly. The spring element may be a coil spring. The coil spring may be a helical coil spring. The spring assembly may include a plurality of springs.

The spring may be mounted to the manual actuator assembly and/or the base assembly by, for example, thermal bonding. The thermal bonding may be done by, for example, magnetic induction heating. Alternately, or in addition, the spring may be mounted to the manual actuator assembly and/or the base assembly using an adhesive. The adhesive may be thermally cured at least in part using magnetic induction heating.

The magnetic sensor may, for example, be a multi-axis magnetic sensor. The multi-axis magnetic sensor may be a three independent axis magnetic sensor element. The magnetic sensor may include three magnetic sensor elements configured to sense magnetic fields in three independent axes.

The device may further include, for example, a switch element. The switch element may be configured to be actuated by a movement of the manual actuator element by a user, such as in the form or a push or press action on the actuator or directly on the switch element. The switch element may be a mechanical dome switch or other type of switch.

The processing element may be coupled, for example, to the magnetic sensor to receive the magnetic field signals, which may be analog or digital signals, and generate an output signal, responsive to a displacement of the manual actuator element from a released state position. The output signal may be configured to be usable by an electronic computing system, such as by being formatted in a corresponding analog or digital signal format usable by the electronic computing system, such as Universal Serial Bus (USB) formatted signal or other signal format. The output signal may be a command to the electronic computing system. The command may be based on a predefined displacement or position of the manual actuator element from the released state position. The output signal may be a command to the electronic computing system based on a predefined movement of the manual actuator element.

Alternately, or in addition, the magnet may be disposed in the base assembly, and the magnetic sensor may be disposed in the manual actuator assembly.

In another aspect, the disclosure relates to a method of manufacturing a magnetic thumbstick user interface device. The method may include, for example, positioning a restorative element in contact with a manual actuator assembly element and a base assembly element, and heating the restorative element using magnetic induction to bond the restorative element with the manual actuator assembly element and the base assembly element.

The manual actuator assembly element and the base assembly element may include, for example, thermoplastic elements, and the heating may bond the elements by melting and flowing the thermoplastic elements to the restorative element. The restorative element may be a spring. The spring may be made from an electrically conductive and/or ferromagnetic material. The spring may be configured with one or both ends open. The manual actuator assembly element may be a top spring retaining pivot, and the base assembly element may be a spring retaining sleeve.

The method may further include, for example, applying a bonding agent to the elements, wherein the heating is applied to cure the bonding agent. The bonding agent may be an adhesive.

Various additional details of aspects of magnetic user UID mechanical, electronic, hardware, and software elements, modules, and configurations are described in the following patent applications assigned to the assignee of the instant application (denoted collectively herein as the "Related Applications"). These Related Applications include U.S. Utility patent application Ser. No. 11/37,069, filed May 26, 2011, entitled USER INTERFACE DEVICES, APPARATUS, AND METHOD, U.S. Provisional Patent Application Ser. No. 61/411,406, filed Nov. 8, 2010, entitled SLIM PROFILE MAGNETIC USER INTERFACE DEVICES, U.S. Provisional Patent Application Ser. No. 61/419,150, filed Dec. 2, 2010, entitled MAGNETICALLY SENSED KNOB-ACTUATOR USER INTERFACE DEVICE, U.S. Provisional Patent Application Ser. No. 61/424,496, filed Dec. 17, 2010, entitled KNOB-ACTUATOR USER INTERFACE DEVICE WITH MAGNETIC SENSORS, U.S. Utility patent application Ser. No. 11/37,069, filed May 26, 2011, entitled USER INTERFACE DEVICES, APPARATUS, AND METHODS, U.S. Utility patent application Ser. No. 13/214,209, filed Aug. 21, 2011, entitled MAGNETIC SENSING USER INTERFACE DEVICE METHODS AND APPARATUS, U.S. Provisional Patent Application Ser. No. 61/525,755, filed Aug. 20, 2011, entitled USER INTERFACE DEVICE METHODS AND APPARATUS USING PERMANENT MAGNETS OR ELECTROMAGNETS AND CORRESPONDING MAGNETIC SENSORS, U.S. Provisional Patent Application Ser. No. 61/345,956, filed on May 18, 2010, entitled SPRING SUSPENDED MAGNETICALLY SENSED USER INTERFACE DEVICES, U.S. Provisional Patent Application Ser. No. 61/363,173, filed Jul. 9, 2010, entitled SPRING SUSPENDED MAGNETICALLY SENSED USER INTERFACE DEVICES, and U.S. Provisional Patent Application Ser. No. 61/372,025, filed Aug. 9, 2010, entitled SPRING SUSPENDED MAGNETICALLY SENSED USER INTERFACE DEVICE. The content of each of these Related Applications is hereby incorporated by reference herein in its entirety for all purposes.

As used herein, the term "permanent magnet" refers to any object that is magnetized and creates its own persistent magnetic field that may be sensed by one or more associated magnetic sensors. Suitable ferromagnetic materials for a permanent magnet include iron, nickel, cobalt, rare earth metals and their alloys, e.g. Alnico and Neodymium. Permanent magnets can also be made of powderized ferromagnetic material held together with an organic binder or other appropriate materials. In some embodiments, electromagnets may be used in place of or in addition to permanent magnets, with the electromagnets controlled by electrical circuits and switching elements, which may be controlled by a processing element, to generate magnetic fields for sensing by associated magnetic sensors.

The term "released state" as used herein describes a state in which no operator-initiated forces are acting upon a magnetically-sensed manual actuator besides those which are inherently an aspect of the structure of the device itself or the environment, such as the force of gravity.

The terms "displace" and "displacement" as used herein in reference to a manual actuator and corresponding magnet, in configurations where the manual actuator and magnet are coupled, refers to various manual movements thereof, including, but not limited to, tilting movements about the X and Y axes, vertical movements along the Z axis, and permutations and combinations thereof. The same definition applies to movement of the magnetic sensor in a converse arrangement where the magnetic sensor is coupled to the manual actuator and moves adjacent to a stationary corresponding magnet.

The term "exemplary" as used herein means "serving as an example, instance, or illustration." Any aspect, detail, function, implementation, and/or embodiment described herein as "exemplary" is not necessarily to be construed as preferred or advantageous over other aspects and/or embodiments.

A magnetic thumbstick device in accordance with aspects of the present invention may include a manual actuator assembly including a manual actuator element to facilitate user interaction. The manual actuator assembly may be pivotably mounted by a restorative element, such as a spring or springs or a flexibly membrane or other compressed element, to a base assembly so that the manual actuator and attached magnet or magnets are free to move through a limited range about one or more magnetic sensors, which may be part of or coupled to the base assembly.

The magnet is typically closely paired with a magnetic sensor. In some embodiments, multiple magnetic sensors may be used; however, in an exemplary embodiment, the magnetic sensor comprises a multi-axis magnetic sensor device configured to measure two or three independent magnetic field components at approximately a single compact point in space, which is typically within the packaging of the magnetic sensor device, such as within an integrated circuit chip package. When the position of a magnetic sensor is referenced herein, the referenced sensor position refers to a point or small area or volume in proximity to or within the sensor package where the magnetic fields generated by the magnet are measured. Further technical details regarding example devices utilizing an arrangement of permanent magnets and magnetic sensors as may be implemented in embodiments of the present invention are described in, for example, U.S. patent application Ser. No. 11/37,069 filed May 26, 2011, entitled USER INTERFACE DEVICES, APPARATUS, AND METHODS, the entire disclosure of which is incorporated by reference herein.

In a typical embodiment, a magnetic thumbstick device includes a manual actuator assembly including a manual actuator element, a restorative element, a base assembly, one or more magnets, and one or more magnetic sensors. In addition, associated components such as printed circuit boards, mounting hardware, electronics and processing elements, such as microprocessors, microcontrollers, memory devices, input/output (I/O) devices, switches, associated mechanical components, and other elements may be included, such as on a printed circuit board, flex circuit, or other mounting mechanism.

For example, referring to FIGS. 1-4, details of one embodiment of a magnetic thumbstick device 100 in accordance with certain aspects is illustrated. Magnetic thumbstick device 100 may include a manual actuator element 110, which may include one or more sub-elements or features and may be part of a manual actuator assembly. For example, in an exemplary embodiment, manual actuator element 110 may be formed as shown in FIG. 1 with an upper actuator section, such as disk-shaped actuator section 112, which may be configured in a curved shape, such as the slightly concave configuration as shown, to facilitate user contact and interaction. Positioned below the disk-shaped actuator section 112, the manual actuator element 110 may further include an actuator shaft section 114, which may be coupled to a lower actuator element, such as the dome-shaped actuator section 116 as shown, which may act as a cover and/or mechanical coupling element. Other shapes of manual actuator elements may also be used in various embodiments to allow user contact and manipulation with the magnetic thumb stick device.

Figure 2:
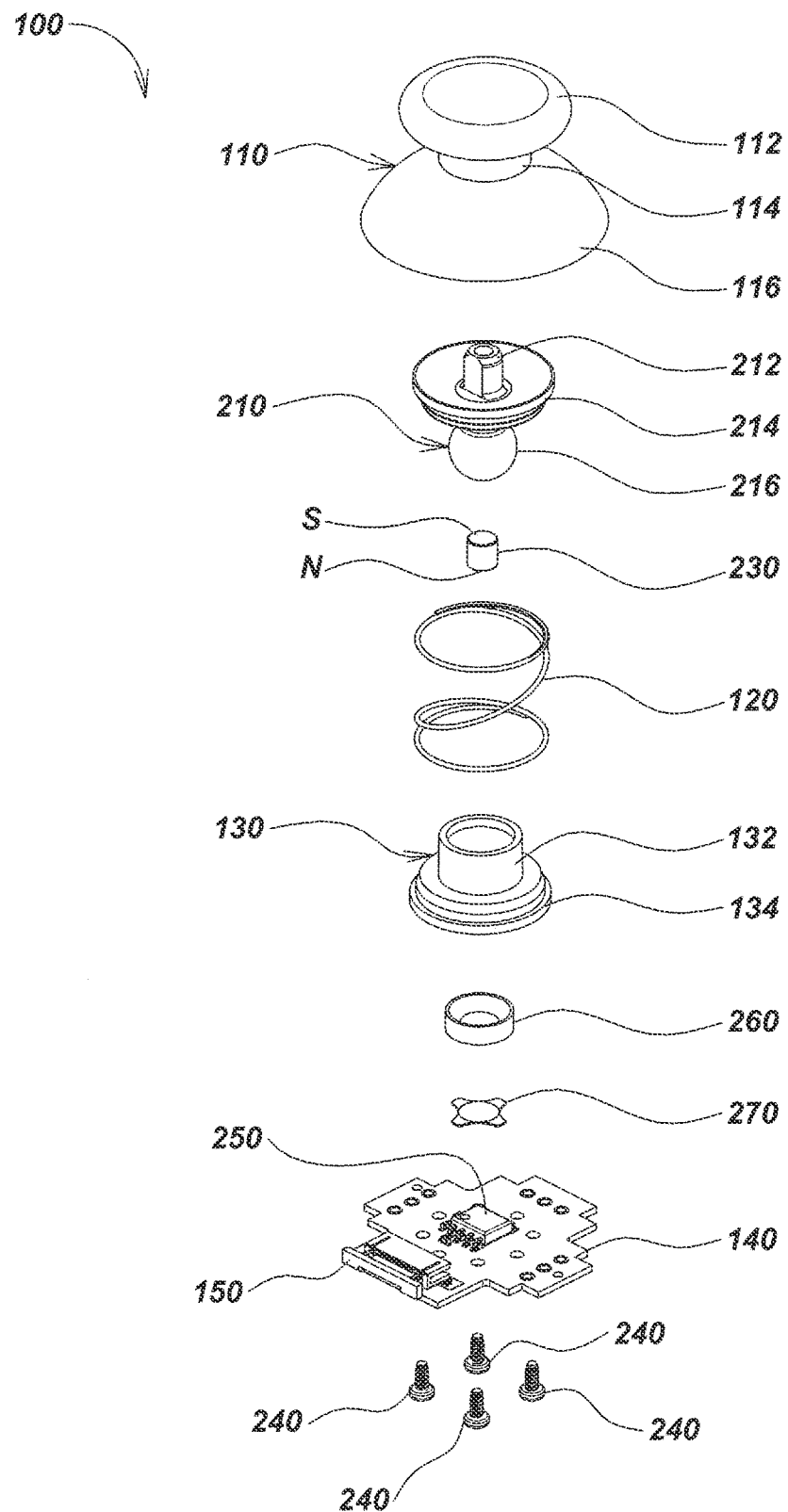
FIG. 2 is a top down exploded view illustrating details of the construction of the embodiment of FIG. 1.
Figure 3:
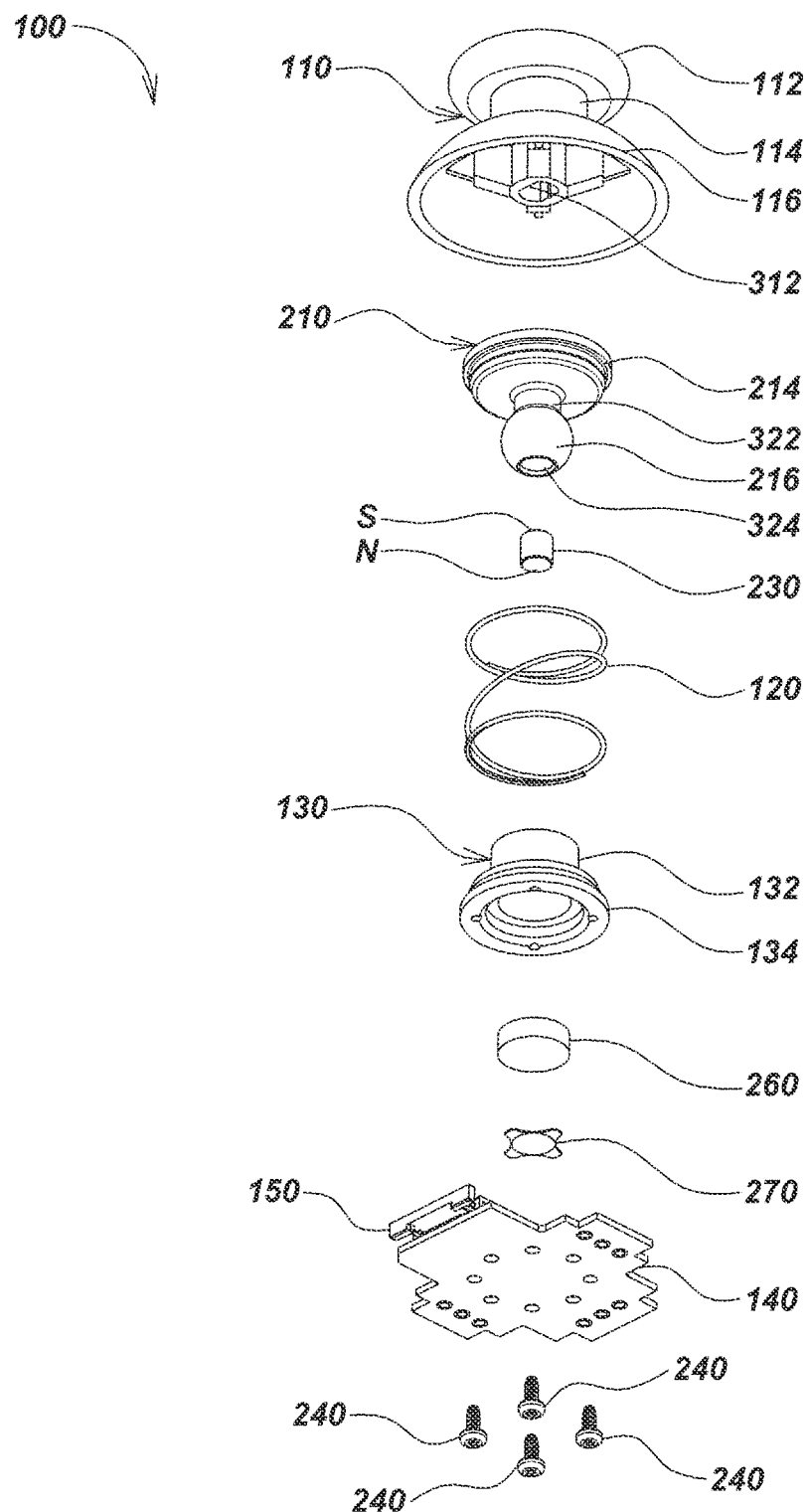
FIG. 3 is a bottom up exploded view illustrating details of the construction of the embodiment of FIG. 1.

The manual actuator element 110 may be keyed or otherwise mechanically configured to couple with additional elements of a manual actuator assembly to facilitate movement in response to user interaction and to restore the manual actuator element 110 to a released position after user interaction. For example, as shown in FIG. 3, a keying element, such as actuator keying element 312 as shown, may be formed within the dome-shaped actuator section 116 to couple manual actuator 110 with additional elements, such as with a key 212 of pivot element 210 as shown in FIG. 2. Key 212 may be formed in an upper spring retention element of the manual actuator assembly, such as top spring-retaining pivot 210, which may be further configured to couple a spring or other restoration element to the manual actuator element 110. Top spring retaining pivot 210 may be coupled with a cover element, such as by connecting with dome-shaped actuator section 116 via keying element 312 and key 212.

Figure 4:
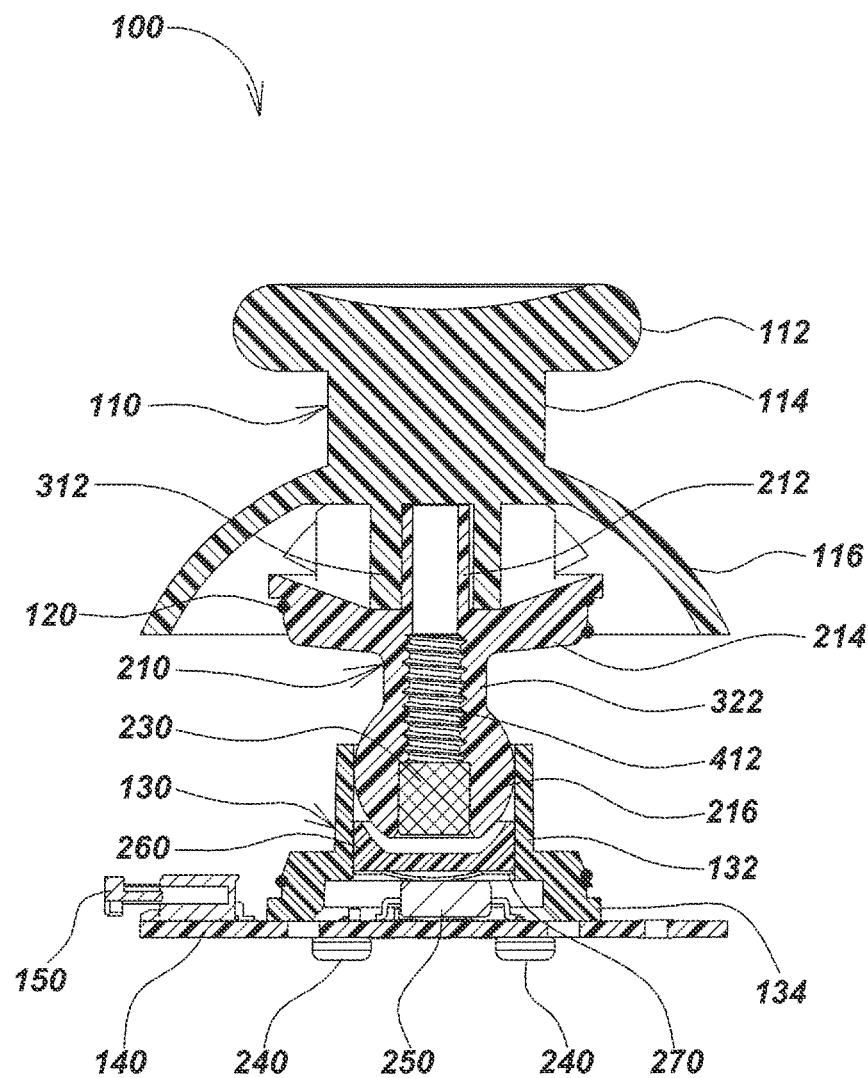
FIG. 4 is a vertical sectional view taken along line 4-4 of the embodiment of FIG. 1.

An upper spring retention element may be positioned beneath the key 212 to capture one end of a spring or other restorative element. For example, the upper spring retention element may be configured in the form of a spring-retaining disk section 214 of pivot 210, such as shown in FIGS. 2-4.

A movement control element of the manual actuator assembly, configured to control motion of the manual actuator, such as a curved element such as spherical section 216 as shown, may be coupled to the spring-retaining disk section 214, such as by a shaft 322, which may be cylindrical in shape as shown. In operation, the movement control element, mechanically interacting with other elements of the magnetic thumbstick device, such as pivot pad 260 and/or sleeve 130 of a base assembly, and/or other elements (not shown), may act to mechanically control which directions and over what ranges the manual actuator element may be moved by a user. The movement control element, in conjunction with other elements, may also be configured to mechanically control motion limits, smoothness of motion or resistance to motion, and/or other motion-related parameters, such as by adding appropriate surface textures, shapes, finishes, lubricants, stops, or other features. In the exemplary embodiment shown, the movement control element includes a spherical curved shape and the base assembly includes a correspondingly contoured surface over which the spherical curved shape can move during user interaction with the manual actuator element 110.

One or more magnets may be disposed on or within the movement control element to generate magnetic fields for sensing by one or more fixed magnetic sensors. For example, the bottom of the spherical section 216 may be formed with a magnet cavity 324 for receiving an electromagnet and/or permanent magnet, such as permanent magnet 230 as shown. In alternate configurations, the movement control element may house a magnetic sensor or sensors rather than a magnet, in which case the magnet may be fixed and the sensor may be moved in conjunction with movement of the actuator. In some embodiments, a magnet or magnetic sensor may be positioned on or in a different element of a manual actuator, depending on the particular component configuration.

In an exemplary embodiment, a magnet may be mounted within pivot 210 to generate magnetic field signals for position sensing responsive to movement of the manual actuator element 110 by a user. For example, behind the magnet cavity 324, a threaded cavity 412, as shown in FIG. 4, may be formed through the vertical axis of the cylindrical shaft 322 between the spring-retaining disk section 214 and the spherical section 216. The magnet cavity 324 may be sized to mount a magnet, such as permanent magnet 230 as shown, that may be cylindrical in shape. Although the magnet 230 as shown is cylindrical in shape in the illustrated embodiment, in other embodiments, a variety of differently shaped magnets may be used in a similar fashion. In some embodiments an electromagnet may be used, in which case wiring for driving the electromagnet may be routed through components of the manual actuator assembly and to an electronic circuit, such as on printed circuit board 140. The wiring may be routed, for example, along or in proximity to spring 120.

In a typical embodiment, a helical coil spring may be used as a restorative element to return the manual actuator element to a released state position relative to a base assembly. For example, a coiled center spring 120 may be used as shown and may be fixed relative to a mounting position on the manual actuator assembly and a mounting position on a base assembly of the magnetic thumbstick device. Other restorative elements may be used in alternately embodiments. The manual actuator assembly may include, for example, manual actuator element 110, pivot element 210, magnet 230, and/or other associated components (not shown for clarity). The base assembly may include, for example, bottom spring retaining sleeve 130, which may be coupled to printed circuit board 150, pivot pad 260, magnetic sensor 250, and/or other related components (not shown for clarity).

In the embodiment shown, spring-retaining disk section 214 of pivot 210 may be shaped and sized to mount the top of center spring 120 to couple it to the manual actuator. On the bottom of center spring 120, a bottom spring-retaining sleeve 130 may be mounted to hold the other end of center spring 120 and may also function as a support base for controlling movement of the manual actuator 110 by mechanically interacting with spherical section 216. In operation, center spring 120 may be used to provide a restoring force to return manual actuator 110 to a released state from a displaced state once the user has released it or when it is not being used.

Bottom spring-retaining sleeve 130 may be formed with a hole through the vertical axis, and may include a sphere-retaining element, such as cylindrical section 132, which may be positioned about the top. Sleeve 130 may further include a disk-shaped spring-retaining base section 134 on the bottom to hold the spring in position. Sphere-retaining cylindrical section 132 may be sized to fit the spherical section 216 of the top spring-retaining pivot 210 within the hole formed about the vertical axis of the bottom spring-retaining sleeve 130. The disk-shaped spring-retaining base section 134 may be sized to mount the bottom of the center spring 120.

A printed circuit board (PCB) may be included in a magnetic thumbstick device to mount electronic components, such as magnetic sensors, analog or digital electronic components, switches, processing elements, memory, and/or other components. For example, a PCB 140 may be mounted on sleeve 130, such as about the bottom of the disk-shaped spring-retaining base section 134 as shown, by a set of screws 240 or other mechanical attachment mechanisms, such as adhesives and the like. An electrical connector 150, such as a ten pin connector, may be mounted to the PCB 140 to facilitate transfer of output signals from the magnetic thumbstick device to other components, such as to an input to an electronic computing system.

Still referring to FIGS. 1-4, a magnetic sensor 250, such as the commercially available Melexis MLX90333, the Melexis MLX 90363 sensor, the BLBC3-B CMOS 3D Compass sensors from Baolab Microsystems, or other magnetic sensors as are known or developed in the art, may be mounted to the PCB 140. The magnetic sensor may be mounted so that it is enclosed by sleeve disk-shaped spring-retaining base section 134 of the bottom spring-retaining sleeve 130. Details regarding various magnetic sensors and associated device configurations are described in, for example, U.S. patent application Ser. No. 11/37,069 filed May 26, 2011, entitled USER INTERFACE DEVICES, APPARATUS, AND METHODS, the content of which is incorporated by reference herein. Although certain commercially available sensors are reference herein, other types of magnetic sensors besides the Melexis MLX90333 Hall effect sensor may also be used including, but not limited to, GMR sensors and InSb magnetoresistors.

A pivot pad 260 (or other motion control contact element not shown) may be positioned above the magnetic sensor 250 and within the hole formed about the vertical axis of the bottom spring-retaining sleeve 130 to mechanically interact with a motion control element of the manual actuator assembly, such as spherical section 216 of pivot 210, during operator interaction with the manual actuator element 110. For example, pivot pad 260 may be cylindrical in shape and may have a top face contoured to accommodate a corresponding shape of the motion control element to aid in controlling movement of the manual actuator element 110. In the example shown, pivot pad 260 may have a top face contoured to accommodate the spherical section 216 of the top spring-retaining pivot 210 so that the spherical section may move about the contoured face during user interaction.

A magnetic thumbstick device may also include one or more switches to allow user interaction by switch actuation. For example, a mechanical dome switch 270 may be positioned between the pivot pad 260 and the magnetic sensor 250. The mechanical dome switch 270 may be oriented so that the dome is downward facing toward and in contact with the magnetic sensor 250. Optionally a spacer (not shown) may be used.

In alternative embodiments, the orientation of the mechanical dome switch 270 may be reversed so that the dome of the mechanical dome switch 270 is upward facing away from the magnetic sensor 250. When the manual actuator 110 is depressed with sufficient force, the spherical section 216 of the top spring-retaining pivot 210 may actuate the mechanical dome switch 270 by pressing it against the magnetic sensor 250 and into the pivot pad 260, thereby providing the user with tactile feedback in the form of a click or other mechanical action. In some embodiments, additional switches may be including on a magnetic thumbstick device in positions other than directly on top of or within the manual actuator element 110. For example, switches may be disposed on the sides of the manual actuator element 110, and/or the base of the thumbstick device, or in other positions on the thumbstick device.

Figure 5:
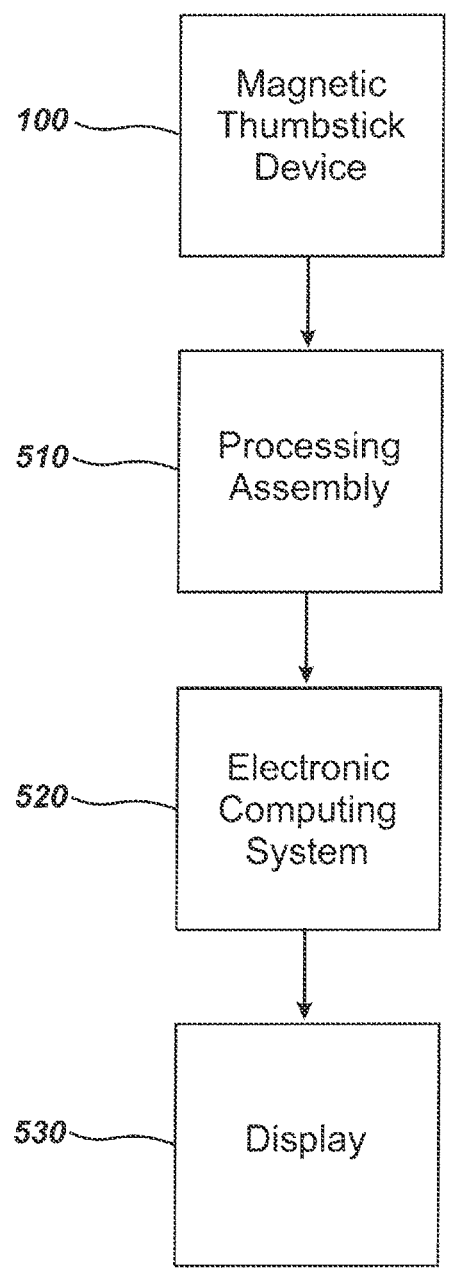
FIG. 5 is an embodiment of a flow diagram illustrating data processing as may be done in a magnetic thumbstick device such as the embodiment shown in FIG. 1.

The sphere-retaining cylindrical section 132 of the bottom spring-retaining sleeve 130 may hold the mechanical dome switch 270 stationary and centered between the permanent magnet 230 and the magnetic sensor 250. As the permanent magnet 230 approaches and contacts the mechanical dome switch 270, the magnetic sensor 250 may measure a distinct increase in the magnitude of the magnetic field over time when the mechanical dome switch 270 actuates. A signal from the magnetic sensor 250 may then be provided to a processing element, such as a processing element 510 (as shown in FIG. 5), where it may be used as a type of pushbutton control which, in turn, may result in generation of a particular command to be provided as an output to an electronic computing system 520 (as shown in FIG. 5).

In operation, the processing element 510 may receive data from the magnetic sensor 250, process the data into an output signal format appropriate for the electronic computing system 520, and transfer the output signal and corresponding data to the electronic computing system 520. Example electronic computing systems 520 may include, but are not limited to; a video game console system, personal computer (PC), a robotic device, a smart phone, a tablet device, a graphical art system such as a computer aided design system, or other similar devices or systems. Furthermore, one or more electrical contact points may also be used in conjunction with the mechanical dome switch 270 to provide additional pushbutton-type controls in some embodiments.

The magnetic sensor 250 and the permanent magnet 230 may be operatively positioned so that when the manual actuator 110 is displaced from a released state, the magnetic sensor 250 generates sensor output signals in response to the displacement. Such signals generated by the magnetic sensor 250 in response to the displacements of the manual actuator 110 may interpreted by sent to and interpreted by the processing element 510 to determine various commands to the electronic computing system 520. For example, by tilting the manual actuator 110 in one direction, a command may be generated and provided to the electronic computing system 520 to move a player, object, etc., in virtual space in a similar lateral direction. Specific commands associated with each displacement of the manual actuator 110 may be different and may be customizable for each particular application. Additional details of processing element configurations and processing methods that may be used to generate and process magnetic sensor signals are described in, for example, U.S. patent application Ser. No. 13/3214,209, entitled MAGNETIC SENSING USER INTERFACES DEVICE METHODS AND APPARATUS, which is incorporated herein by reference.

In an exemplary embodiment, magnetic thumbstick device 100 may include a permanent magnet 230 which is relatively small (relative to the size of the device 100) and which may be positioned close to the magnetic sensor 250. If the permanent magnet 230 is axially magnetized, a preferred mounting distance between the permanent magnet 230 and the magnetic sensor 250 may be less than four magnet diameters when the magnetic thumbstick device 100 is in a released state. If the permanent magnet 230 is not round, this mounting distance may be measured at a right angle to the dipole axis.

When an increasingly larger permanent magnet 230 is used, the magnetic sensor 250 may become more susceptible to measurement saturation of the magnetic field components. As the magnetic sensor 250 becomes saturated with the magnetic fields, subtle movements of the manual actuator 110 and the permanent magnet 230 may become less distinguishable by the processing element 510, which may lessen the degree of sensitivity to such movements. However, a larger magnet may be used in some embodiments to provide a greater absolute range of travel of the actuator. Small magnets generally provide a higher sensitivity to motion but at the expense of a shorter range of total travel. Consequently, in embodiments having a relatively large actuator where a larger range of travel (i.e. not angle, but displacement range) a larger magnet may be advantageously used.

When the permanent magnet 230 is positioned further from the magnetic sensor 250, the relative magnitude of each magnetic field may fall off approximately as the inverse power of three. Therefore, precise measurements of the magnitude and direction of the magnetic field components may become increasingly more difficult to derive as the magnetic sensor 250 is positioned further from the permanent magnet 230. Consequently, similar tradeoffs as described above with respect to magnet size may be applied to magnet positioning (relative to the sensor).

In an exemplary embodiment, the magnetic sensor 250 may be mounted within a volume bounded by the center spring 120.

During manufacture, there are various ways in which center spring 120 may be mounted into a magnetic thumbstick device such as magnetic thumbstick device embodiment 100. Example methods in which such a device may be manufactured include mechanically mounting by threading ends around an inner core or into an outer ring, bonding with adhesive or using some other bonding agent, insert molding the center spring 120 into plastic parts, and heating the spring and allowing an adjoining thermoplastic material to flow around the heated ends of the center spring 120.

However, mechanically mounting the center spring 120 by threading ends onto an inner core or an outer ring requires a very high degree of precise control over the shape and size of the ends. Because of difficulties in precisely winding of the center spring 120, the result is frequently an imprecise final shape and position of the center spring 120 within the device itself. Bonding the center spring 120 using adhesive or some other bonding agent, such as solder, requires longer cure or heating times and are subject to misalignment from handling during manufacture. A spring that is insert-molded into plastic components is done so using complicated molds and associated shutoffs and can still result in misaligned springs.

In accordance with another aspect, a low stress, highly aligned method of installation and spring retention may be performed by heating the spring and allowing an adjoining thermoplastic material to flow around the ends thereof. Magnetic induction heating of the spring may be a particularly cost effective and quick method to do this. For example, this approach may be used to mount center spring 120 without requiring any additional calibration to align the center spring 120.

An induction coil (not illustrated) may be utilized to heat the ends of the center spring 120 through magnetic induction. The center spring 120 must be electrically conductive or ferromagnetic or both when placed inside the induction coil to facilitate heating. Additional control in manufacture may be achieved while using magnetic induction if the center spring 120 has open ends that do not close the circuit, thus avoiding a shorted turn effect. When an electric current is induced in the ends of the center spring 120, the current may travel about the ends of the center spring 120 causing the conductive material to quickly become hot due to the resistive losses. A thermoplastic material for components coupled to the spring, such as top spring-retaining pivot 210 and bottom spring-retaining sleeve 130, may be selected to melt and flow onto the ends of the center spring 120, thereby forming a mechanical coupling between the center spring 120 and the top spring-retaining pivot 210 and the bottom spring-retaining sleeve 130. This method may work best when the induction coil is only slightly larger in diameter than the center spring 120, or high induction power may be used to fuse smaller springs. Magnetic induction of center spring 120 may also be used to cure certain adhesives or other bonding agents if they are used in certain embodiments.

In manufacture of the magnetic thumbstick device 100, threaded cavity 412 may be used to accurately align the permanent magnet 230 and the magnetic sensor 250 once the center spring 120 may been secured, such as by magnetic induction, to the top spring-retaining pivot 210 and the bottom spring-retaining sleeve 130. A threaded alignment fixture (not illustrated), when secured to the bottom spring-retaining sleeve 130, may be screwed into the threaded cavity 412 so that the top spring-retaining pivot 210 and the bottom spring-retaining sleeve 130 are both aligned along the same Z axis and an optimal distance from one another for inductively mounting the center spring 120. When the center spring 120 is mounted to the top spring-retaining pivot 210, which mounts the permanent magnet 230, and the bottom spring-retaining sleeve 130, which encloses the magnetic sensor 250 when mounted to the PCB 140, a more precise centering of the permanent magnet 230 about the magnetic sensor 250 may be achieved because the magnetic induction method of assembly is both low stress and allows a high degree of alignment. The precise aligning of the center spring 120 at a released state of the manual actuator 110 may maximize the available dynamic range of the magnetic thumbstick device 100 and thereby improve its overall sensitivity and performance. Methods as are known or developed in the art may be used for positional fixturing during assembly.

Referring to FIG. 5, data from the magnetic thumbstick device 100 may be transmitted to the processing element or assembly 510. The processing element 510 may include, among other components, a microcontroller such as the commercially available NXP LCP2366 microcontroller or other microprocessors, digital signal processors (DSPs), or programmable devices, memories, analog and/or digital components, such as I/O components, ASICs, logic devices, and/or other electronic components. Once the data generated from the magnetic thumbstick device 100 is processed, and corresponding commands are generated, command data may be transmitted from the processing element 510 to the electronic computing system 520 as an output signal. The electronic computing system 520 may then receive the output signal and process the received commands to generate output for presentation on a display 530 or other output device and/or for storage or transmission to other systems or devices. Details of example processing functions as may be performed in processing element 510 are described in, for example, U.S. Utility patent application Ser. No. 13/214,209 entitled MAGNETIC SENSING USER INTERFACE DEVICE METHODS AND APPARATUS, and U.S. Provisional Patent Application Ser. No. 61/525,755, filed Aug. 20, 2011, entitled USER INTERFACE DEVICE METHODS AND APPARATUS USING PERMANENT MAGNETS OR ELECTROMAGNETS AND CORRESPONDING MAGNETIC SENSORS, the content of which is incorporated by reference herein in its entirety.

Figure 6:
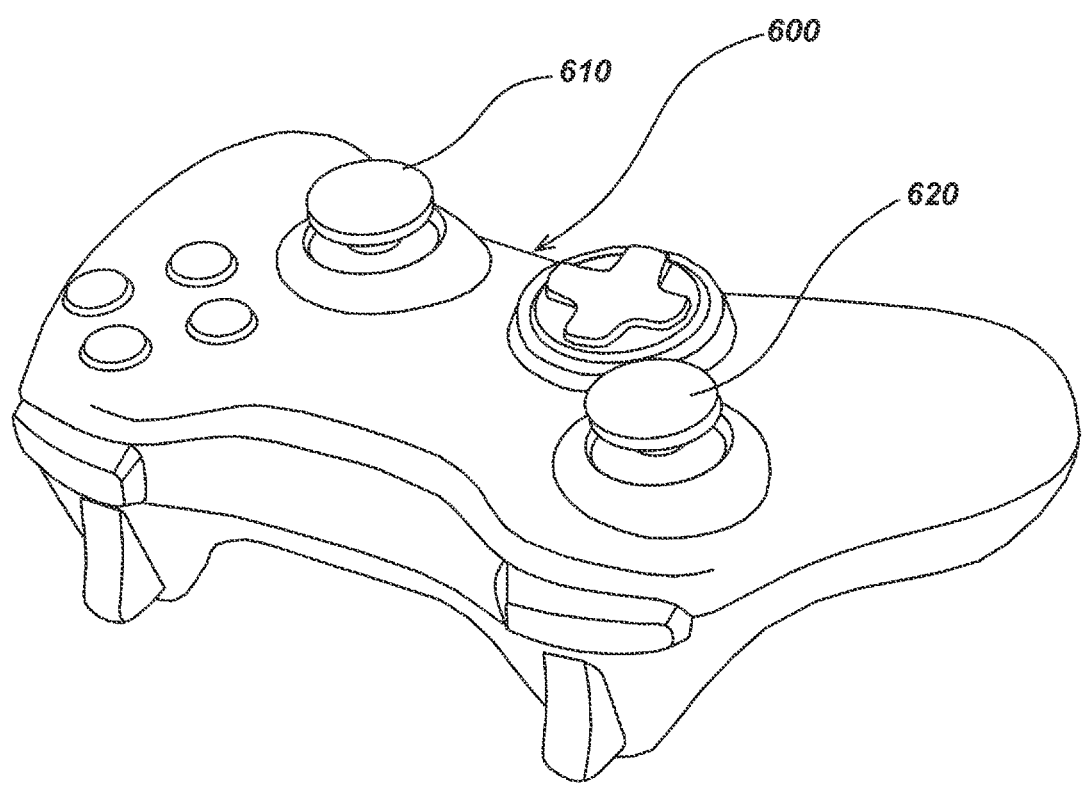
FIG. 6 is an embodiment of a flow diagram illustrating data processing as may be done in a magnetic thumbstick device such as the embodiment shown in FIG. 1.
Figure 7:
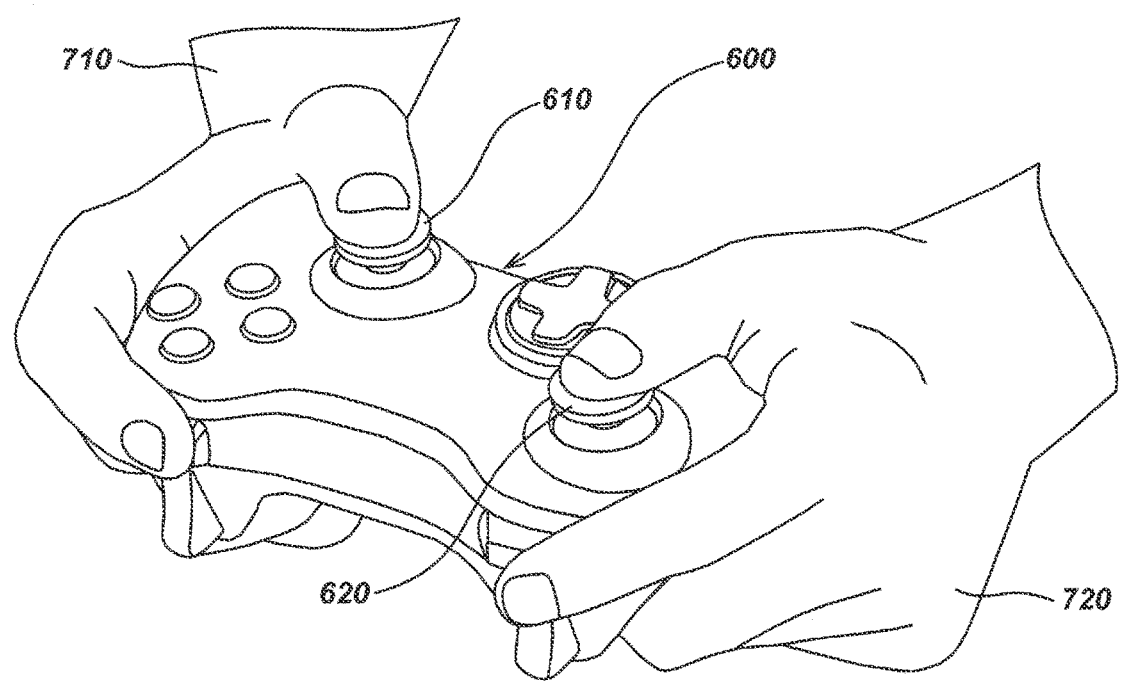
FIG. 7 is an isometric view of the pointing device embodiment of FIG. 5 being manipulated by a user's hands.
Figure 8:
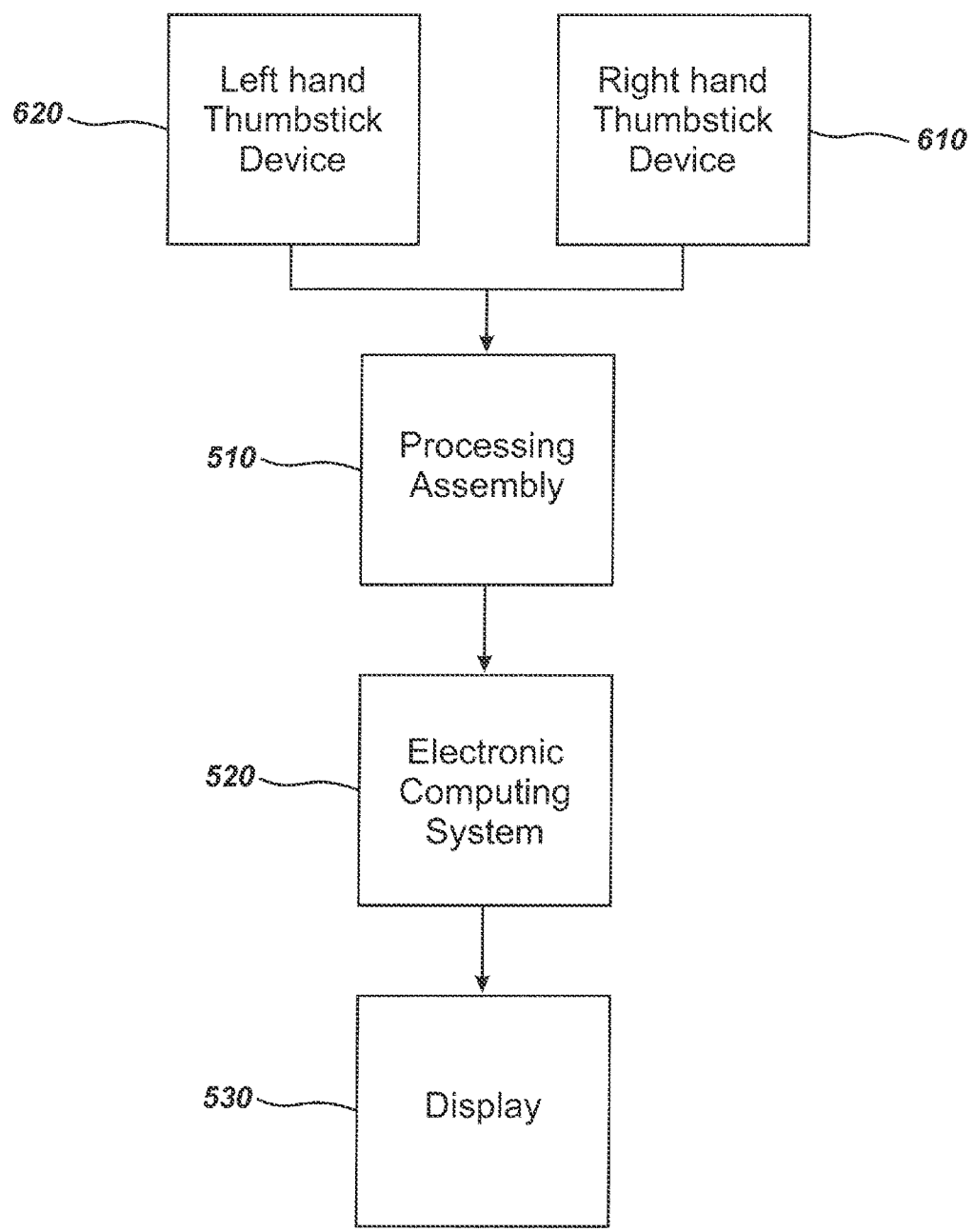
FIG. 8 is a flow diagram illustrating an example progression of data from two magnetic thumbstick devices within the same device package.
Figure 9:
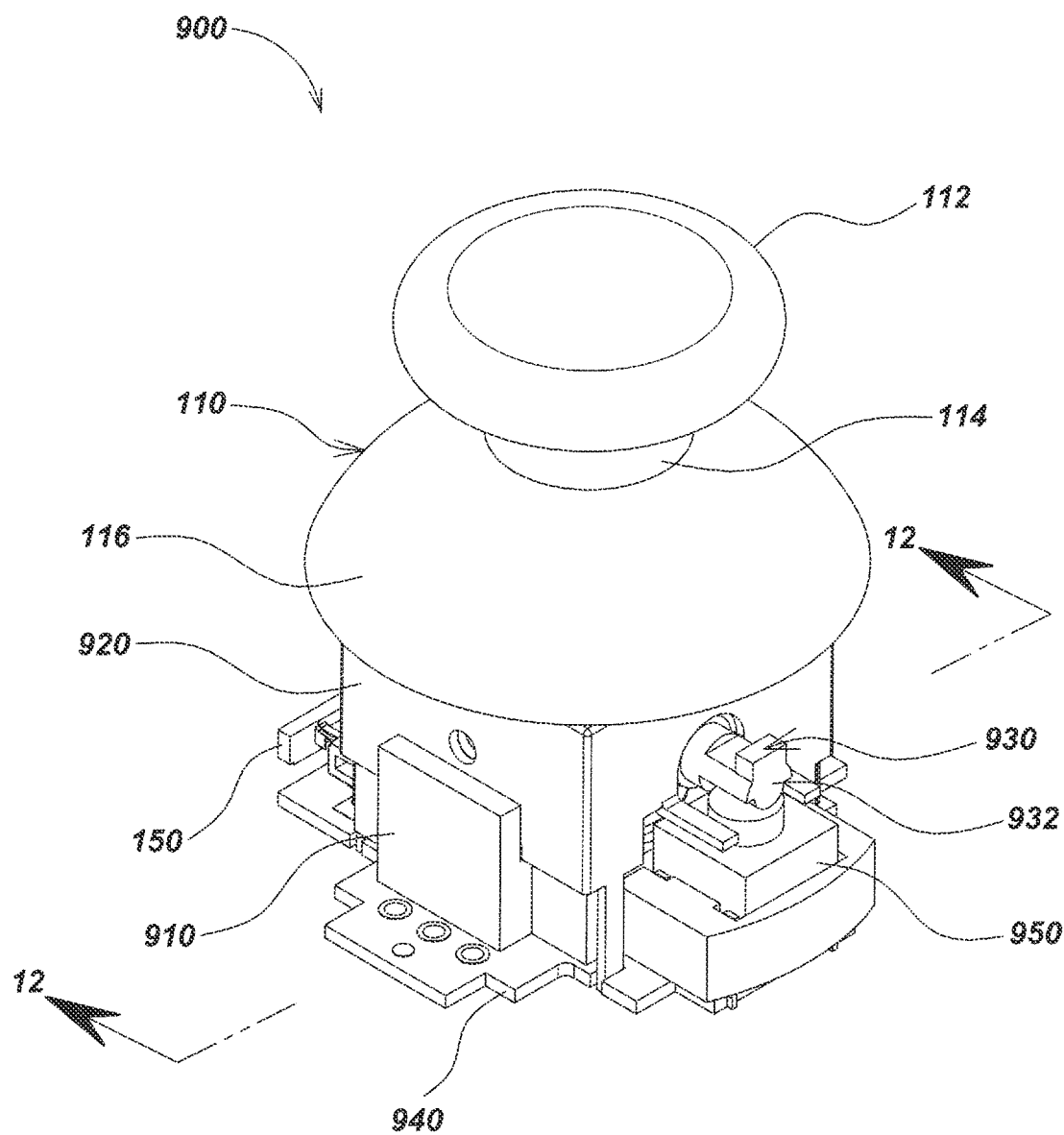
FIG. 9 is an isometric view of an alternative embodiment of a magnetic thumbstick device.

Referring to FIGS. 6-8, a controller device embodiment 600, which may be similar to the game controller used with the Xbox 360® commercially available from Microsoft®, except using two of the magnetic thumbstick devices 100, is shown. Device 600 includes a right-hand thumbstick device 610 and a left-hand thumbstick device 620 for use by corresponding hands/fingers. In FIG. 7, the right-hand thumbstick device 610 is being used with a user's right hand 710 and the left-hand thumbstick device 620 is being used with a user's left hand 720. In instances where more than one of the magnetic thumbstick devices 100 are being used, such as with controller 600 wherein a user is interacting simultaneously with both right and left hand thumbstick devices 610 and 620, data from both the right-hand thumbstick device 610 and the left-hand thumbstick device 620 may be generated in controller 600 and transmitted to and processed by a processing element 510 for generation of output signals to be provided to the Xbox 360® or other system.

Referring to FIGS. 9-14, modifications of components used in commercially available thumbstick devices, such as the ALPS® RKJXP1224002 Stick Controller used in thumbstick devices for the Xbox 360® game controllers available from Microsoft®, may be performed to create an alternative magnetic thumbstick device embodiment 900. In magnetic thumbstick embodiment 900, potentiometers may be replaced from an ALPS® RKJXP1224002 Stick Controller with a magnet and magnetic sensor configuration, such as one of the permanent magnets 230 and one of the magnetic sensors 250 as described previously herein.

A manual actuator element, such as manual actuator element 110 as described previously, may be positioned about the top of the other components of device 900 as shown. This implementation may be advantageously performed to modify existing geometries to utilize the permanent magnet 230 and the magnetic sensor 250 instead of potentiometers, thereby reducing the dead band. Although such a configuration may provide improved performance over non-magnetic configurations, because of the geometry of these existing devices and associated friction between components, the embodiment 900 may not minimize dead band to the same extent as the magnetic thumbstick device embodiment 100 previously described herein.

Figure 11:
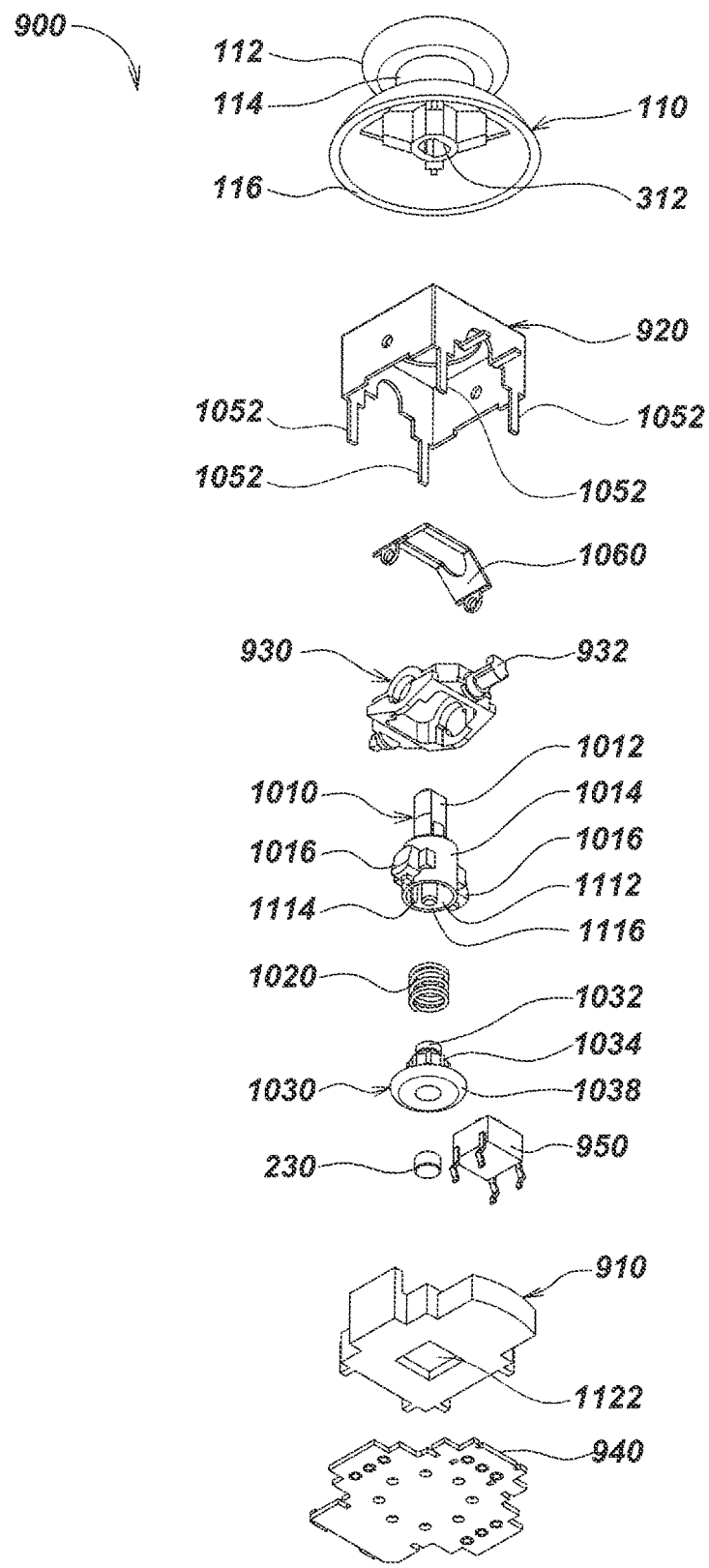
FIG. 11 is a bottom up exploded view of the embodiment of FIG. 9.
Figure 13:
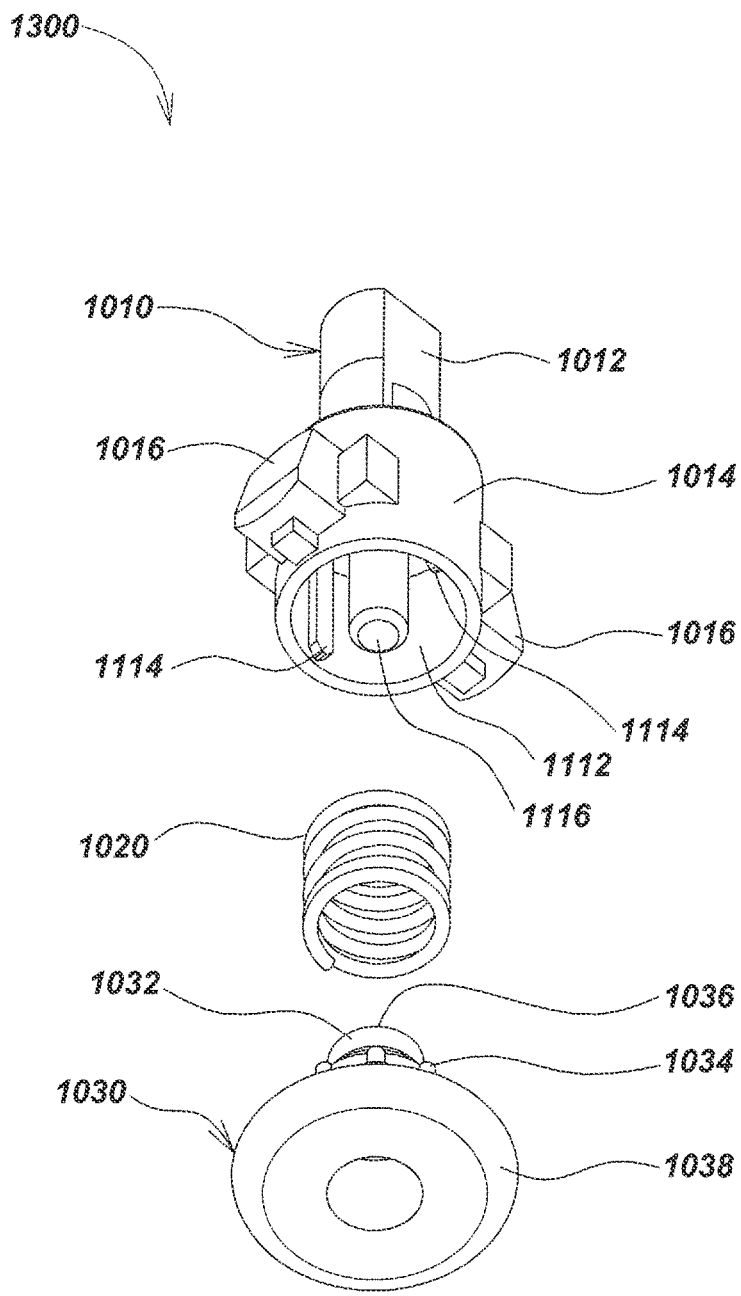
FIG. 13 is a detailed bottom up exploded view of a center column assembly from the embodiment of FIG. 9.

As shown in FIG. 13, a center column assembly 1300 may be made to mount to an actuator keying element 312 (as shown in FIG. 11) of the manual actuator element 110. The top section of the center column assembly 1300 may include a top column 1010. The top column 1010 may be largely cylindrical and formed with a top column keying element 1012 which fits the actuator keying element 312. Below the top column keying element 1012, the top column 1010 may be further formed with a cylindrical element 1014 with a pair of pivot nubs 1016. One of the pivot nubs 1016 may be formed on either side of the same diameter of the cylindrical element 1014. The top column 1010 of the center column assembly 1300 may be further formed with a spring recess 1112 in the bottom of the cylindrical element 1014. Along the inner circumference of the spring recess 1112, a pair of keying teeth 1320 may be formed. A keying post 1116 may be further formed within the center of the spring recess 1112 that extends below the bottom of the cylindrical element 1014.

Center column assembly 1300 may further include a spring, such as helical spring 1020, and a bottom slider 1030. The helical spring 1020 may be mounted within the spring recess 1112 of the top column 1010 and a spring mount element 1032 on the bottom slider 1030. A grooved element 1034 may be formed below the spring mount element 1032 to prevent, in conjunction with the keying teeth 1320 of the top column 1010, rotations of the bottom slider 1030 in relation to the top column 1010. The spring mount element 1032 and the grooved element 1034 may be sized to fit within the spring recess 1112 so that the keying teeth 1320 fit snugly between the grooves of the grooved element 1034.

Figure 10:
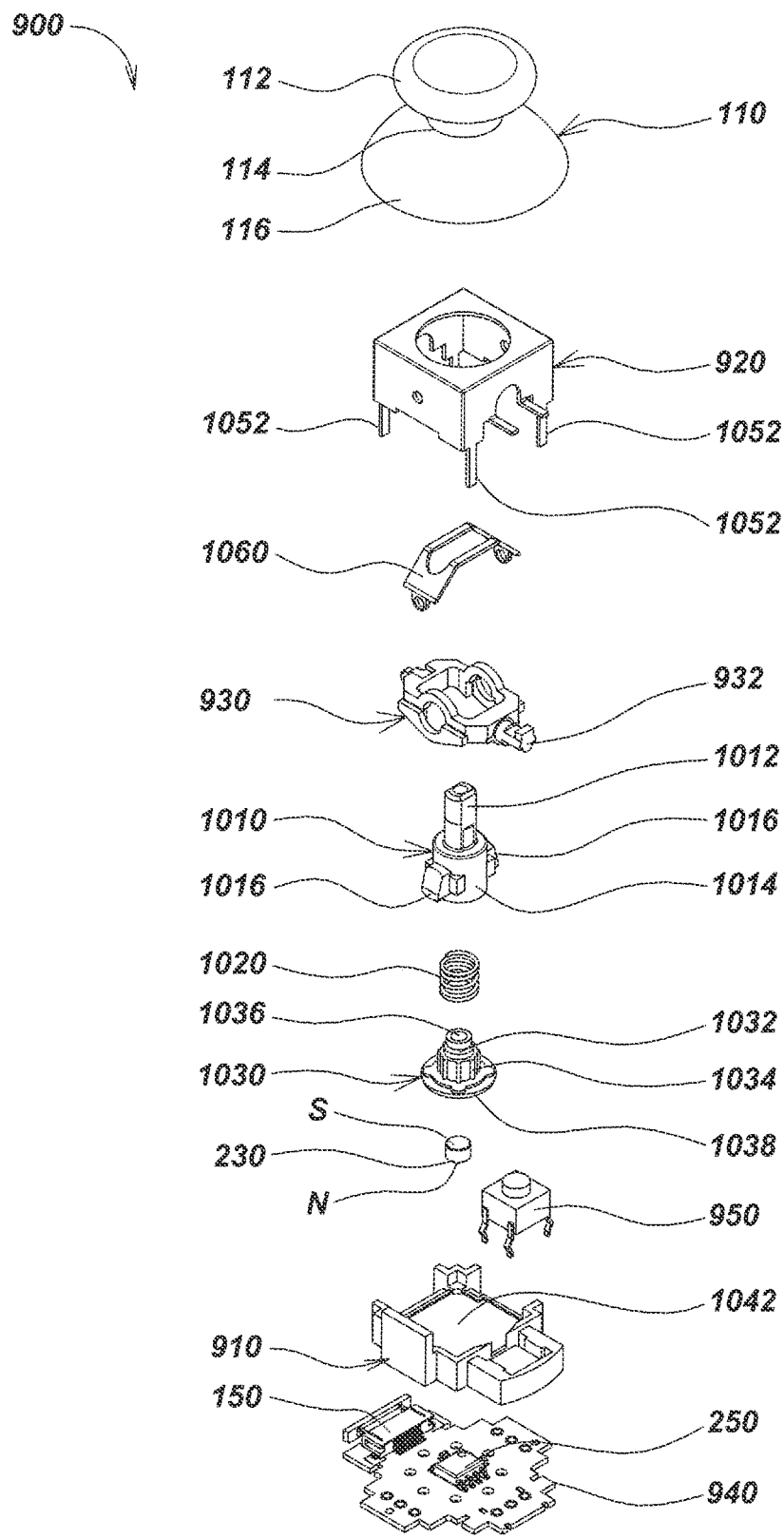
FIG. 10 is a top down exploded view of the embodiment of FIG. 9.

When assembled, the keying post 1116 may be positioned to extend through the vertical axis of the helical spring 1020 and within a post recess 1036. The post recess 1036 may be formed about the vertical axis of the bottom slider 1030. A slider disk element 1038 may be formed about the bottom of the bottom slider 1030. A magnet, such as permanent magnet 230 (as shown in FIGS. 10 and 11), may be mounted centrally into the circular facing on the bottom of the slider disk element 1038. A slide base 910 may be positioned below the center column assembly 1300 nearest to the slider disk element 1038. The slider disk element 1038 may be made to slide against a sliding surface 1042 on the slide base 910 during displacements of the manual actuator element 110. On the bottom side of the slide base 910, a sensor crevice 1122 may be formed to accommodate the magnetic sensor 250.

Figure 12:
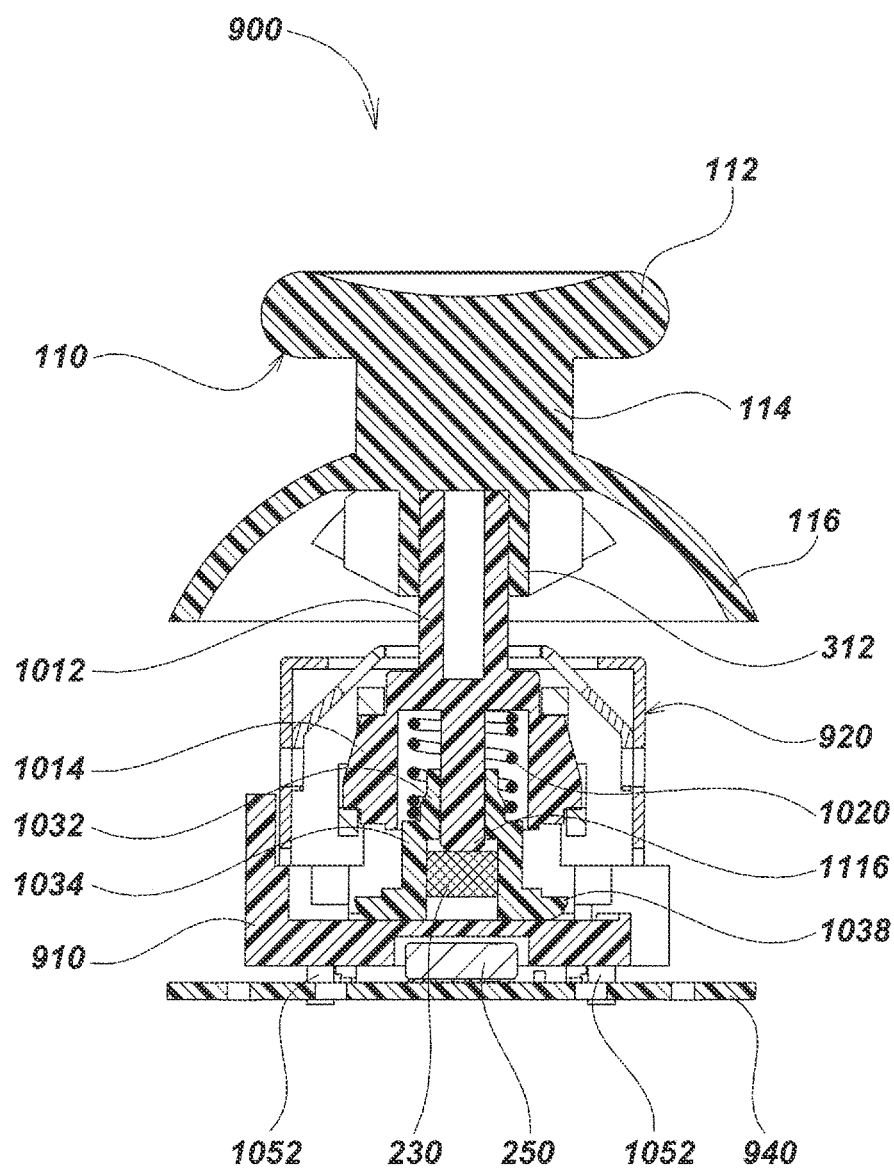
FIG. 12 is a vertical sectional view taken along line 12-12 of FIG. 9.
Figure 14:
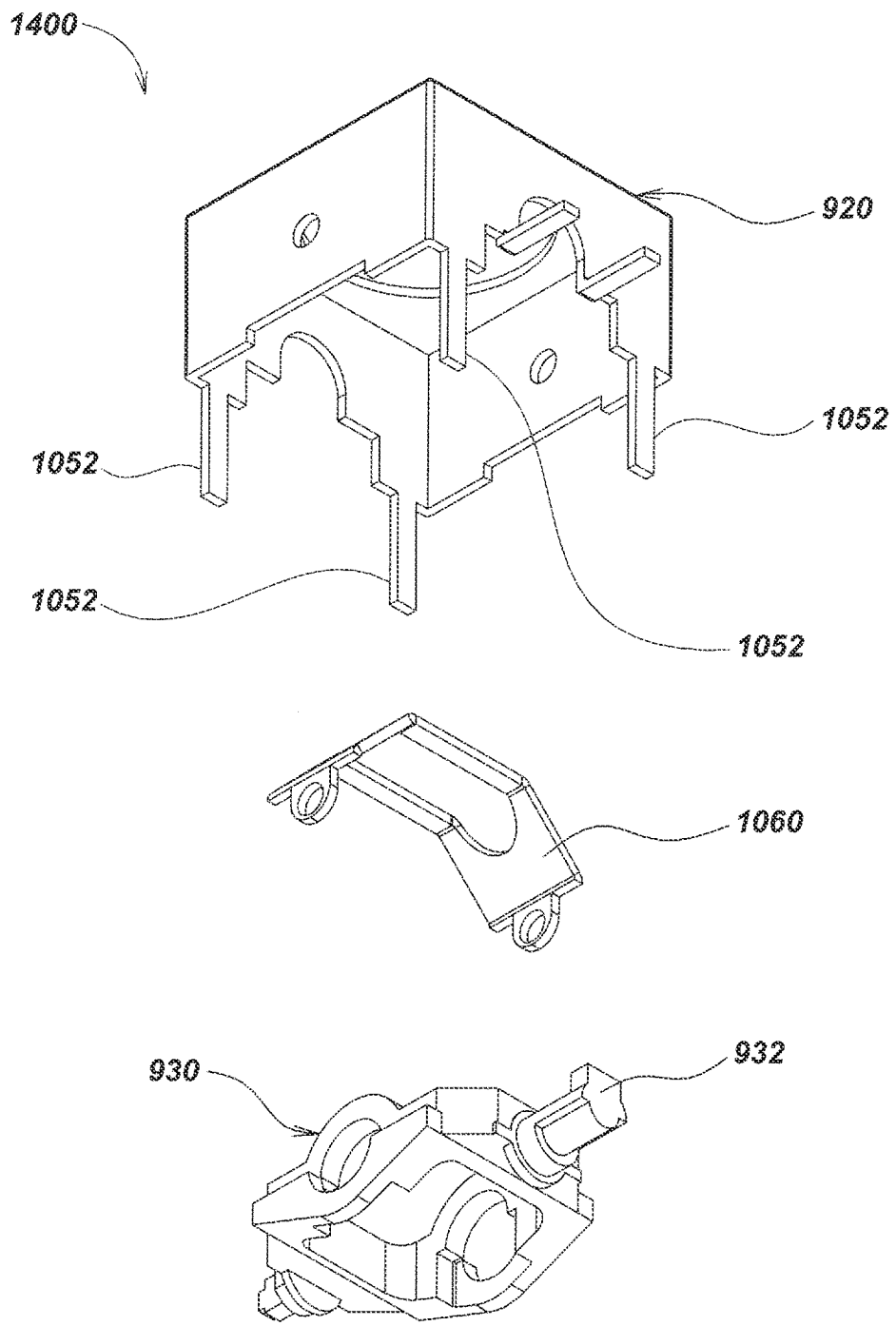
FIG. 14 is a detailed bottom up exploded view of a gimbal assembly from the embodiment of FIG. 9.

Referring to FIG. 14, a gimbal assembly 1400 may attach to the pivot nubs 1016 of FIG. 10 of the top column 1010 FIG. 10. The gimbal assembly 1400 may permit tilting movements of the manual actuator element 110 (as shown in FIG. 10) and the center column assembly 1300 (as shown in FIG. 13) about the X axis, Y axis, and combinations thereof. The gimbal assembly 1400 may include a gimbal housing 920, an outer gimbal element 1060, and an inner gimbal element 930 formed with a switch punch arm 932. A series of housing keying elements 1052 may be formed about the bottom of the gimbal housing 920. The slide base 910 may be secured to the gimbal housing 920 so that tension is created by depressing the helical spring 1020 as shown in FIG. 10. When the manual actuator 110 is tilted, the center column assembly 1300 is made to tilt causing the slider disk element 1038 to tilt in relation to the sliding surface 1042 (as shown in FIGS. 10-12). As the manual actuator 110 is released, tension from the helical spring 1020 may push the slider disk element 1038 flat against the sliding surface 1042, returning the manual actuator 110 to an appropriately centered released state.

Referring to FIGS. 9-14, a PCB 940, which may contain the magnetic sensor 250 and the electrical connector 150, may be attached below the slide base 910. The permanent magnet 230 and the magnetic sensor 250 may be positioned so that they are closely paired to one another. PCB 940 may be configured to accommodate the housing keying elements 1052, mounting the gimbal housing 920 to its surface.

Still referring to FIGS. 9-14, switch punch arm 932 may be formed along one of the arms of the inner gimbal element 930 connecting the inner gimbal element 930 to the gimbal housing 920 so that the switch punch arm 932 extends beyond the enclosure of the gimbal housing 920. When the manual actuator 110 is depressed, the switch punch arm 932 may be moved downward to actuate a tact switch 950, thereby providing the user push button control. The tact switch 950 may be seated on a section of the slide base 910 that is not enclosed by the gimbal housing 920 and is functionally connected to the PCB 940.

Embodiment 900 of FIGS. 9-14 may exhibit additional dead band, in comparison to embodiment 100 of FIGS. 1-8, due to the function of the bottom slider 1030. As displacements of the manual actuator 110 occur, the bottom slider 1030 may be moved along the sliding surface 1042 of the slide base 910, thereby causing friction between the bottom slider 1030 and the sliding surface 1042. The friction from bottom slider 1030 may result in additional dead band in embodiment 900 of FIGS. 9-14 that is not present in embodiment 100 of FIGS. 1-8. However, embodiment 900 or similar or equivalent embodiments may still be used to provide improved performance over traditional potentiometer-based designs.

Some embodiments may use high sensitivity magnetic sensors paired with a small magnet or magnets, such as the commercially available BLBC3-B CMOS 3D Compass sensors from Baolab Microsystems or Xtrinsic MAG3110 Digital Magnometers from Freescale, or other compass or high sensitivity sensors. In such embodiments, one or more magnetic sensors may be used as a reference sensor to measure and generate reference signals that may be used to subtract off any local or background magnetic fields, such as the earth's magnetic field or locally generated magnetic fields.

It some embodiments, permanent magnets, such as described previously herein, may be replaced, in whole or in part, with electromagnets, such as chip scale electromagnet devices (which may be configured, for example, similar to small SMT inductors). A high sensitivity sensor device, such as a compass sensor as described previously herein, may be used with the electromagnet to build a compact, single sensor user interface device. This approach may be viewed similar to a configuration where "permanent" magnets could be switched off and on, such as by a processing element as described previously herein, thereby allowing use of two or more different electromagnets with a single compact three axis sensor. This allows a far smaller, lower cost, single sensor magnetic user interface device to be built compared to one having multiple three axis sensors or larger three-axis sensors. Applications for this type of compact device may include notebook computers, smart phones, tablet devices, or devices where small and/or thin under interface devices may be useful. Since high sensitivity sensors such as compass sensors are very sensitive, a very low powered, very small electromagnet array (e.g., a cross-shaped pair or other configuration of electromagnets) may be used in place of permanent magnets in some implementations.

One potential advantage of such an implementation is that a pair of crossed dipoles (e.g., the energized electromagnets) that are energized in sequence or in combination may be used to eliminate ambiguity associated with the movement around the axis of symmetry of a single dipole, and thereby allow a single three axis sensor to be used while still allowing up to six degrees of freedom to be sensed. Electromagnet embodiments may use similar elements and methods to those described previously herein for permanent magnet implementations. The primary difference is replacement of one or more permanent magnets with small controllable electromagnets (e.g., dipoles), and associated electromagnet driver controls and/or associate sensor controls, which may be part of a processing element.

For example, in one embodiment of an electromagnet magnetic UID configuration a cross-shaped electromagnet may use a small chip scale, wire wound surface mount (SMT) cross dipole inductor the can produce either a magnetic dipole A or a magnetic dipole B, such as by using a cross-shaped electromagnet, when electric current is run through wire windings A or B.

A cross-shaped electromagnet may be placed above a small digital magnetometer (such as Freescale MAG3110 device or other similar or equivalent device), and the crossed dipole may be moved by the user relative to a small compass or other high sensitivity magnetic field sensor (e.g., digital magnetometer) device and sequential measurements of the field of dipole A and then dipole B may be measured when current is passed through each of these in sequence, thereby allowing the positional displacement and tilt of the relative movement and tilt between the two components to be measured.

Another potential advantage of use of an electromagnet is that both magnets A and B can be turned off, thereby allowing a reference measurement of the background ambient magnetic field to be made, allowing the orientation of the UID to be measured with respect to the earth's magnetic field. This can allow a correction for the biasing effect of the earth's magnetic field and may provide an improvement in accuracy. It may also allow the user interface to note when the rotation of the UID is changed by the user, thereby allowing a behavior change with respect to the indicated operator motion with respect to the orientation of the user display.

While we have described and illustrated various exemplary embodiments of magnetic thumbstick devices, modifications and adaptations of the embodiments described herein will be apparent to persons skilled in the art. For example, an initial calibration of a magnetic thumbstick device may be used to compensate for errors in positioning of the permanent magnet(s) and/or magnetic sensor(s) due to manufacturing tolerances or other variation, and may be stored in the device, such as in a memory of a processing element. More than one permanent magnet and one magnetic sensor may be used in alternative embodiments of the magnetic thumbstick device, and the relative positioning of magnets and magnetic sensors may be varied or reversed. For example, in embodiments of a magnetic thumbstick device with more than one permanent magnet and more than one magnetic sensor, the magnetic sensors may preferably be placed far enough apart so that the magnetic field generated by each of the permanent magnets do not strongly influence the measured magnetic fields at each of the magnetic sensors. Furthermore, other shapes, sizes, magnetic field orientations, and configurations of magnets and magnetic sensors, such as those described in the Related Applications, may also be used within various magnetic thumbstick device implementations.

In some configurations, the magnetic thumbstick apparatus, devices, methods, or systems described herein may include means for implementing features or providing functions described herein, such as means for generating, receiving, processing, storing, and/or outputting magnetic sensor signals and generating corresponding output signals suitable for use by an electronic computing system. In one aspect, the aforementioned means may be a module or assembly including a processor or processors, associated memory and/or other electronics in which embodiments of the invention reside, such as to implement the various aspects and functions as described herein. These may be, for example, modules or apparatus residing in magnetic thumbstick devices or software, in personal computers or other electronic computing systems, game controllers, mobile phones or smart phones, tablet devices, or other electronic devices or systems.

In one or more exemplary embodiments, the electronic functions, methods and processes described herein and associated with magnetic signal processing functions may be implemented in hardware, software, firmware, or any combination thereof. If implemented in software, the functions may be stored on or encoded as one or more instructions or code on a computer-readable medium that may be executed by a processing or other programmable device. Computer-readable media includes computer storage media. Storage media may be any available media that can be accessed by a computer processor or processors. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure.

Those of skill in the art would understand that information and signals, such as video and/or audio signals or data, control signals, command signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Signals may be formatted in accordance with definitions and specifications defining such signals, such as USB® signals, Firewire® signals, or other currently defined signaling formats or signaling formats later-developed in the art.

Those of skill would further appreciate that the various illustrative logical blocks, modules, circuits, and algorithm steps described in connection with the embodiments disclosed herein may be implemented as electronic hardware, computer software, electro-mechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various modifications to the embodiments described herein will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and/or illustrated in the accompanying drawings.

It is noted that reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects and embodiments is provided to enable any person skilled in the art to make or use the present invention. Various modifications to these aspects will be readily apparent to those skilled in the art, and the generic principles defined herein may be applied to other aspects without departing from the spirit or scope of the invention. Thus, the invention is not intended to be limited to the aspects shown herein but is to be accorded the widest scope consistent with the following claims and their equivalents.

I claim:

1. A magnetic thumbstick user interface device (UID), comprising:
   a manual actuator assembly comprising a magnet, a manual actuator element, and a movement control element including a substantially spherical section having a cavity to receive the magnet;
   a base assembly comprising:
      a base element having a pivot pad and a contoured surface on which the substantially spherical section is movable during user interaction with the manual actuator element;

a multi-axis magnetic sensor to sense magnetic field components in three orthogonal axes (X, Y and Z); and a processing element to generate, based on the sensed magnetic field components, output signals corresponding to a position or movement of the manual actuator element, relative to a compact point in space, in the three orthogonal axes; and a restorative element coupled to the base assembly and the manual actuator assembly for restoring the manual actuator element to a released-state position.

2. The device of claim 1, wherein the magnet comprises a permanent magnet.

3. The device of claim 1, wherein the magnet comprises an electromagnet.

4. The device of claim 1, wherein the base assembly further includes a retaining sleeve configured to restrict a motion of the movement control element.

5. The device of claim 1, further including a printed circuit board (PCB) coupled to the pivot pad.

6. The device of claim 5, wherein the magnetic sensor is disposed on the PCB.

7. The device of claim 1, wherein the restorative element comprises a spring element.

8. The device of claim 7, wherein the spring element is a helical coil spring.

9. The device of claim 7, wherein the spring element comprises a plurality of springs.

10. The device of claim 7, wherein the spring is thermally bonded to the manual actuator assembly and the base assembly to be fused at least partially to the manual actuator assembly.

11. The device of claim 10, wherein the thermal bonding comprises magnetic induction heating.

12. The device of claim 7, wherein the spring is mounted to the manual actuator assembly and the base assembly using a thermally cured adhesive.

13. The device of claim 12, wherein the adhesive is thermally cured at least in part using magnetic induction heating.

14. The device of claim 1, wherein the magnetic sensor comprises a single integral multi-axis magnetic sensor for sensing magnetic fields at a compact point in space.

15. The device of claim 1, wherein the multi-axis magnetic sensor is a three independent axis magnetic sensor element.

16. The device of claim 1, wherein manual actuator element comprises a plastic material and the plastic material is at least partially fused around a portion of the spring.

17. The device of claim 1, further comprising a switch element configured to be actuated by a movement of the manual actuator element.

18. The device of claim 17, wherein the switch element comprises a mechanical dome switch.

19. The device of claim 1, further comprising a processing element coupled to the magnetic sensor, wherein the processing element is programmed to receive the magnetic field signals and generate an output signal, responsive to a displacement of the manual actuator element from a released state position, usable by an electronic computing system.

20. The device of claim 19, wherein the output signal is a command to the electronic computing system based on a predefined displacement of the manual actuator element from the released state position.

21. The device of claim 19, wherein the output signal is a command to the electronic computing system based on a predefined movement of the manual actuator element.

22. The device of claim 1, wherein the magnet is disposed in the base assembly and the magnetic sensor is disposed in the manual actuator assembly.

23. A magnetic thumbstick user interface device (UID), comprising:

a manual actuator assembly comprising a permanent magnet, a manual actuator element, and a movement control element;

a base assembly comprising a base element, a pivot pad, a multi-axis magnetic sensor to sense magnetic field components in three orthogonal axes (X, Y and Z), and a processing element to generate, based on the sensed magnetic field components output signals corresponding to a position or movement of the manual actuator element, relative to a compact point in space, in the three orthogonal axes;

a printed circuit board (PCB) coupled to the pivot pad; and a restorative spring element coupled to the base assembly and the manual actuator assembly for restoring the manual actuator element to a released-state position;

wherein the magnetic sensor is disposed on the PCB;

wherein the movement control element comprises a substantially spherical section and the base assembly includes a contoured surface shaped to engage the substantially spherical section to control movement of the curved element during user actuation of the manual actuator element; and wherein the permanent magnet is closely paired with the multi-axis magnetic sensor.

24. The device of claim 23, wherein the base assembly further includes a retaining sleeve configured to restrict a motion of the movement control element.

25. The device of claim 23, wherein the restorative spring element is a helical coil spring.

26. The device of claim 23, wherein the restorative spring element comprises a plurality of springs.

27. The device of claim 23, further comprising a mechanical dome switch element configured to be actuated by a movement of the manual actuator element.

28. The device of claim 23, further comprising a processing element coupled to the magnetic sensor, the processing element configured to receive the magnetic field signals and generate an output signal, responsive to a displacement of the manual actuator element from a released state position, usable by an electronic computing system.

29. The device of claim 28, wherein the output signal is a command to the electronic computing system based on a predefined displacement of the manual actuator element from the released state position.

* * * * *